United States Patent
Machida et al.

(10) Patent No.: US 10,875,278 B2
(45) Date of Patent: *Dec. 29, 2020

(54) HEAT RAY SHIELDING FILM, HEAT RAY SHIELDING LAMINATED TRANSPARENT BASE MATERIAL, VEHICLE, AND BUILDING

(71) Applicant: SUMITOMO METAL MINING CO., LTD., Tokyo (JP)

(72) Inventors: Keisuke Machida, Isa (JP); Hiroki Nakayama, Isa (JP); Kenichi Fujita, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/501,472

(22) PCT Filed: Jun. 30, 2015

(86) PCT No.: PCT/JP2015/068809
§ 371 (c)(1),
(2) Date: Feb. 3, 2017

(87) PCT Pub. No.: WO2016/021336
PCT Pub. Date: Feb. 11, 2016

(65) Prior Publication Data
US 2017/0232714 A1 Aug. 17, 2017

(30) Foreign Application Priority Data
Aug. 6, 2014 (JP) .................................. 2014-160669

(51) Int. Cl.
B32B 17/10 (2006.01)
C08K 3/22 (2006.01)
(Continued)

(52) U.S. Cl.
CPC .......... B32B 17/10633 (2013.01); B32B 7/02 (2013.01); B32B 17/10036 (2013.01);
(Continued)

(58) Field of Classification Search
CPC .... G02B 1/02; G02B 5/206–226; G02B 5/26; G02B 5/282; G02B 5/208; C09D 5/32;
(Continued)

(56) References Cited

U.S. PATENT DOCUMENTS 5,376,446 A * 12/1994 Huang .................... B32B 15/08
252/511
8,083,847 B2 12/2011 Takeda et al.
(Continued)

FOREIGN PATENT DOCUMENTS

CN 104620144 5/2015
JP H04-160041 6/1992
(Continued)

OTHER PUBLICATIONS

K. Adachi, et al., J. Appl. Phys. 114, 194304 (2013).
(Continued)

*Primary Examiner* — Kimberly N. Kakalec
(74) *Attorney, Agent, or Firm* — IPUSA, PLLC

(57) ABSTRACT

A heat ray shielding film is disclosed, including composite tungsten oxide particles; and an ionomer resin. The composite tungsten oxide particles are expressed by a general formula $M_xWO_y$ (where M denotes one or more kinds of elements selected from Cs, Rb, K, Tl, In, Ba, Li, Ca, Sr, Fe, Sn, Al, Cu, and Na, and $0.1 \leq x \leq 0.5$ and $2.2 \leq y \leq 3.0$).

16 Claims, 3 Drawing Sheets

(51) Int. Cl.

| | | |
|---|---|---|
| *C08K 5/3475* | (2006.01) | |
| *C08K 5/07* | (2006.01) | |
| *B32B 7/02* | (2019.01) | |
| *C09K 3/00* | (2006.01) | |
| *B32B 27/20* | (2006.01) | |
| *C08L 23/26* | (2006.01) | |
| *B32B 37/10* | (2006.01) | |
| *C08J 5/18* | (2006.01) | |
| *C08K 3/08* | (2006.01) | |
| *E06B 3/67* | (2006.01) | |
| *E06B 9/24* | (2006.01) | |
| *G02B 5/20* | (2006.01) | |
| *G02B 5/26* | (2006.01) | |

(52) U.S. Cl.
CPC ........ *B32B 27/20* (2013.01); *B32B 37/1018* (2013.01); *C08J 5/18* (2013.01); *C08K 3/08* (2013.01); *C08K 3/22* (2013.01); *C08K 5/07* (2013.01); *C08K 5/3475* (2013.01); *C08L 23/26* (2013.01); *C09K 3/00* (2013.01); *E06B 3/6715* (2013.01); *E06B 9/24* (2013.01); *G02B 5/208* (2013.01); *G02B 5/26* (2013.01); *B32B 2264/102* (2013.01); *B32B 2307/412* (2013.01); *B32B 2307/416* (2013.01); *B32B 2419/00* (2013.01); *B32B 2605/00* (2013.01); *C08J 2323/08* (2013.01); *C08K 2003/2258* (2013.01); *C08K 2201/003* (2013.01); *C08K 2201/011* (2013.01); *E06B 2009/2417* (2013.01)

(58) Field of Classification Search
CPC ....... C03C 4/082; C03C 17/007; C01G 41/02; B32B 7/02; B32B 7/023; B32B 7/027; B32B 17/10036; B32B 17/10633; B32B 27/20; B32B 2264/102; B32B 37/1018; B32B 2605/00; B32B 2419/00; B32B 2307/416; B32B 2307/412; E06B 3/6715; E06B 2009/2417; E06B 9/24; C08L 23/26; C09K 3/00; C08J 5/18; C08J 2323/08; C08K 5/3475; C08K 3/22; C08K 2201/011; C08K 2201/003; C08K 2003/2258; C08K 5/07; C08K 3/08
USPC ....... 359/350, 359–361, 507, 513, 609, 614, 359/885, 892; 252/587; 427/160; 106/286.7, 479
See application file for complete search history.

(56) References Cited

U.S. PATENT DOCUMENTS

| | | | |
|---|---|---|---|
| 9,783,455 | B2 | 10/2017 | Kodaira et al. |
| 2001/0016261 | A1 | 8/2001 | Kondo |
| 2005/0048218 | A1* | 3/2005 | Weidman ............ B05D 1/08 427/446 |
| 2006/0008640 | A1 | 1/2006 | Chonan et al. |
| 2009/0035583 | A1* | 2/2009 | Fisher ............ B32B 17/10018 428/432 |
| 2010/0140533 | A1 | 6/2010 | Fujita |
| 2010/0187137 | A1* | 7/2010 | Kitahara ............ B01J 20/26 206/205 |
| 2010/0220388 | A1 | 9/2010 | Suzuki et al. |
| 2010/0247810 | A1 | 9/2010 | Yukinobu et al. |
| 2010/0261037 | A1 | 10/2010 | Fujita |
| 2011/0300356 | A1 | 12/2011 | Takamatsu et al. |
| 2011/0318578 | A1 | 12/2011 | Hashimoto et al. |
| 2012/0317903 | A1 | 12/2012 | Kuwano et al. |
| 2013/0187104 | A1 | 7/2013 | Shiraishi et al. |
| 2014/0044978 | A1 | 2/2014 | Haldeman et al. |
| 2014/0127522 | A1 | 5/2014 | Fujita et al. |
| 2015/0175837 | A1 | 6/2015 | Brettmann et al. |
| 2015/0192715 | A1 | 7/2015 | Taguchi et al. |
| 2015/0285972 | A1 | 10/2015 | Hara et al. |
| 2015/0306848 | A1* | 10/2015 | Anderson ........ B32B 17/10477 428/141 |
| 2017/0363788 | A1 | 12/2017 | Fukuda et al. |

FOREIGN PATENT DOCUMENTS

| | | |
|---|---|---|
| JP | H08-217500 | 8/1996 |
| JP | H08-259279 | 10/1996 |
| JP | H08-281860 | 10/1996 |
| JP | H10-297945 | 11/1998 |
| JP | 2001-089202 | 4/2001 |
| JP | 2006-190867 | 7/2006 |
| JP | 2009-035459 | 2/2009 |
| JP | 2009-535248 | 10/2009 |
| JP | 2009-269806 | 11/2009 |
| JP | 2010-017854 | 1/2010 |
| JP | 2010-222233 | 10/2010 |
| JP | 2011-001551 | 1/2011 |
| JP | 2011-178608 | 9/2011 |
| JP | 2012-229388 | 11/2012 |
| JP | 2013-064042 | 4/2013 |
| JP | 2013-088762 | 5/2013 |
| WO | 2005/037932 | 4/2005 |
| WO | 2005/087680 | 9/2005 |
| WO | 2009/020806 | 2/2009 |
| WO | 2009/027160 | 3/2009 |
| WO | 2014/061279 | 4/2014 |

OTHER PUBLICATIONS

International Search Report dated Oct. 13, 2015 with respect to PCT/JP2015/068809.
International Search Report dated Oct. 11, 2016 with respect to PCT/JP2016/069022.
Database WPI, Week 200978, Thomson Scientific, London, GB;, AN 2009-R34807, XP002780133.
Office Action dated Aug. 13, 2019 issued with respect to the related U.S. Appl. No. 15/736,465.
Office Action dated Mar. 29, 2019 issued with respect to the related U.S. Appl. No. 15/625,110.
Office Action dated May 30, 2019 issued with respect to the related U.S. Appl. No. 15/625,110.
Office Action dated Sep. 26, 2019 issued with respect to the related U.S. Appl. No. 15/625,110.
Office Action dated Nov. 18, 2019 issued with respect to the related U.S. Appl. No. 15/736,465.
Office Action dated Feb. 19, 2020 issued with respect to the related U.S. Appl. No. 15/625,110.
Office Action dated May 1, 2020 issued with respect to the corresponding U.S. Appl. No. 15/625,110.
Office Action dated Aug. 25, 2020 issued with respect to the related U.S. Appl. No. 15/625,110.

* cited by examiner

HEAT RAY SHIELDING FILM, HEAT RAY SHIELDING LAMINATED TRANSPARENT BASE MATERIAL, VEHICLE, AND BUILDING

TECHNICAL FIELD

The present invention relates to a heat ray shielding film, a heat ray shielding laminated transparent base material, a vehicle, and a building.

BACKGROUND ART

A heat ray shielding film, including a heat ray shielding with a heat ray shielding ability (a heat ray shielding function), which shields a part of an incident solar energy and can reduce a cooling load, a hot feeling, a baneful influence on plants, and the like, has been desired for window materials of a vehicle, a building, and the like, films of a greenhouse and the like. Various studies have been discussed.

An example is reported in a case of using applications of the window material. The heat ray shielding film is disposed as an intermediate layer (an intermediate film) between multiple sheet glasses facing each other to form a laminated glass.

As an example, Patent Document 1 discloses the laminated glass in which a soft resin layer is provided including a metal oxide film having a heat ray shielding property that is one of tin oxide and indium oxide with a mean particle diameter of less than or equal to 0.1 μm between glasses facing each other.

Also, Patent Document 2 discloses a laminated glass including an intermediate film layer that disperses functional ultrafine particles such as a metal of Sn, Ti, Si, Zn, Zr, Fe, Al, Cr, Co, Ce, In, Ni, Ag, Cu, Pt, Mn, Ta, W, V, and Mo, an oxide, a nitride, a sulfide, each of dope compositions of Sb or F, a composite formed by two or more selected from these materials, or the like between at least two transparent glass sheets.

Also, Patent Document 3 discloses a window glass for a vehicle, in which a mixing layer of ultrafine particles with a mean particle diameter of less than or equal to 0.1 μm and a glass component is formed between transparent plate members. Also, as the ultrafine particles, a metal oxide such as $TiO_2$, $ZrO_2$, $SnO_2$, $In_2O_3$, and the like, or a mixture of these compound may be used. As the glass component, an organic silicon or an organosilicon compound may be used.

Moreover, Patent Document 4 discloses a laminated glass, in which a laminated intermediate film formed of three layers is disposed, and functional ultrafine particles is dispersed, the functional ultrafine particles formed by a metal of Sn, Ti, Si, Zn, Zr, Fe, Al, Cr, Co, In, Ni, Ag, Cu, Pt, Mn, Ta, W, V, and Mo, oxide, nitride, sulfide, dope compositions of Sb or F, a composite formed by two or more selected from these materials, or the like between a second layer of the intermediate film.

However, any one of the laminated glasses disclosed in Patent Document 1 through Patent Document 4 does not have the heat ray shielding sufficient ability if a high visible light transmittance is desired.

Consequentially, Patent Document 5 by the applicant of the present invention discloses a sunlight shielding laminated glass, in which an intermediate layer having a sunlight shielding function is interposed between two glass sheets, and the intermediate layer is formed of an intermediate film formed of an adding liquid, in which hexaboride fine particles are dispersed in a plasticizer (or an adding liquid, in which the hexaboride fine particles and ITO fine particles and/or ATO fine particles are dispersed in the plasticizer), and an intermediate film formed of a vinyl resin.

Also, Patent Document 5 discloses a sunlight shielding laminated glass, in which the intermediate layer having the sunlight shielding function is interposed between the two glass sheets, and the intermediate layer is formed of an intermediate film, which is formed on a surface positioned inside at least one of two glass sheets, and includes a sunlight shielding film formed by coating a coating liquid including hexaboride fine particles as a sunlight shielding component (or a coating liquid including one or more of the hexaboride fine particles, ITO fine particles, and ATO fine particles as the sunlight shielding component), and the vinyl resin interposed between the two glass sheets.

In the film disclosed in Patent Document 5, the hexaboride fine particles used for the sunlight shielding laminated glass are sufficiently small and uniformly dispersed. Thus, a transmittance indicates a maximum value in a range of a light wavelength of 400 nm to 700 nm and a minimum value in a range of a light wavelength of 700 nm to 1800 nm. According to the sunlight shielding laminated glass disclosed in Patent Document 5, even in a case in which the visual ray transmittance is 77% or 78%, a sunlight transmittance is approximately 50% to 60%. Hence, compared to conventional laminated glasses disclosed in Patent Document 1 to Patent Document 4, performance is greatly improved.

Furthermore, the applicant of the present invention discloses in Patent Document 6 a sunlight shielding laminated structure, in which an intermediate layer is interposed between two facing plates formed by selecting from the glass sheet. In the intermediate layer, fine particles having the sunlight shielding function are dispersed in a synthetic resin such as the vinyl resin by using tungsten oxide fine particles and/or composite tungsten oxide fine particles as the fine particles having the sunlight shielding function.

The sunlight shielding laminated structure disclosed in Patent Document 6 includes an example in which the sunlight transmittance is 35.7% when the visual ray transmittance is 70.0%. Compared to the conventional laminated glass described in Patent Documents 1 to 5, the performance is further improved.

PRIOR ART DOCUMENTS

Patent Documents

Patent Document 1: Japanese Laid-open Patent Publication No. H08-217500
Patent Document 2: Japanese Laid-open Patent Publication No. H08-259279
Patent Document 3: Japanese Laid-open Patent Publication No. H04-160041
Patent Document 4: Japanese Laid-open Patent Publication No. H10-297945
Patent Document 5: Japanese Laid-open Patent Publication No. 2001-89202
Patent Document 6: International Publication Pamphlet WO 2005/087680

SUMMARY OF THE INVENTION

Problem to be Solved by the Invention

However, in a case in which an intermediate layer of a sunlight shielding laminated structure disclosed in Patent Document 6 includes a composite tungsten oxide fine particles as the fine particles having the sunlight shielding function, if the intermediate layer alone is retained in an environment of high temperature and high humidity for a long time, a color reducing phenomena is observed in which color is reduced from an edge of the intermediate layer. Also, in a case in which the intermediate layer is formed as the sunlight shielding laminated structure, the color reducing phenomena (an edge fade phenomena) is occurred at an edge portion, which is not covered with a laminated sheet of the intermediate layer.

When the color reducing phenomena occurs as described above, appearances of the intermediate layer alone and the sunlight shielding laminated structure using the intermediate layer are impaired. Furthermore, the heat ray shielding function is reduced.

In view of the above problems of the conventional technologies, it is an object of one aspect of the present invention to provide a heat ray shielding film in that the occurrence of the color reducing phenomena is suppressed.

Means for Solving the Problem

To solve the above problems, the present invention provides a heat ray shielding film, including composite tungsten oxide particles; and an ionomer resin, wherein the composite tungsten oxide particles are expressed by a general formula MxWOy (where M denotes one or more kinds of elements selected from Cs, Rb, K, Tl, In, Ba, Li, Ca, Sr, Fe, Sn, Al, Cu, and Na, and $0.1 \leq x \leq 0.5$ and $2.2 \leq y \leq 3.0$).

Advantageous Effects of the Invention

According to one aspect of the present invention, it is possible to provide a heat ray shielding film in that an occurrence of a color reducing phenomena is suppressed.

MODE FOR CARRYING OUT THE INVENTION

Figure 1:
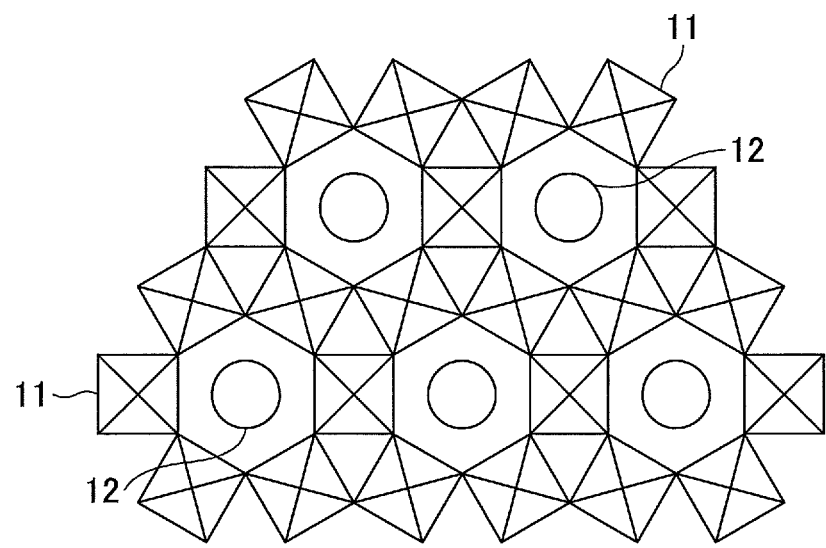
FIG. 1 is a diagram of a crystal structure of composite tungsten oxide including a hexagonal crystal.

In the following, an embodiment of the present invention will be described with reference to the accompanying drawings. However, the present invention is not limited to the embodiment described below, and it should be understood that the various changes and substitutions could be made hereto without departing from scope of the invention.
(Heat Ray Shielding Film)

In the embodiment, first, one configuration example of a heat ray shielding film will be described.

In the heat ray shielding film of the embodiment, it is possible to contain composite tungsten oxide particles and an ionomer resin. As the composite tungsten oxide particles, it is possible to use particles of composite tungsten oxide indicated by a general formula $M_xWO_y$ (where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$).

Regarding the heat ray shielding film (an intermediate layer) containing the composite tungsten oxide particles, the inventors of the present invention have earnestly investigated a method for suppressing the color reducing phenomena.

A polyvinyl acetal resin or the like has been used as a resin contained in a conventional heat ray shielding film. However, the inventors found that a weather resistance is greatly improved under an environment of high-temperature and high-humidity by using the ionomer resin, instead of the polyvinyl acetal resin or the like. Hence, the present invention has been completed.

It has been observed that dope atoms such as cesium and the like are detached from a crystal structure of the composite tungsten oxide, and are changed to an amorphous-state tungsten oxide, so that the reducing of color of the composite tungsten oxide contained in the heat ray shielding film is caused under an environment of high-temperature and high-humidity. (For instance, refer to K. Adachi, et al., J. Appl. Phys. 114, 194304 (2013)).

A reason why the weather resistance is greatly improved by using the ionomer resin as the resin contained in the heat ray shielding film of the embodiment and the occurrence of reducing the color is suppressed is not fully understood. It has been considered due to a characteristic of the ionomer resin in that metal ions are uniformly dispersed and contained in its structure. That is, in the ionomer resin, the metal ions such as sodium, zinc, and the like exist as cations. Thus, it may be presumed that the dope atoms in the composite tungsten oxide become difficult to be scattered in peripheral resins, and the color reducing phenomena hardly occurs.

Contrary, polyvinyl butyral resin and ethylene-vinyl acetate copolymer, which are conventionally used as the resin contained in the heat ray shielding film, do not basically contain the metal ions in their structures. Thus, the color reducing phenomena, in which the composite tungsten oxide reduces the color, may occur.

In the following, the heat ray shielding film of the embodiment will be described in detail.

First, components forming the heat ray shielding film of the embodiment will be described.
(1) Composite Tungsten Oxide Particles As described above, for the composite tungsten oxide particles, it is possible to preferably use particles of composite tungsten oxide expressed by the general formula $M_xWO_y$ (where M is one or more elements selected from Cs, Rb, K, Tl, In, Ba, Li, Ca, Sr, Fe, Sn, Al, Cu, and Na, $0.1 \leq x \leq 0.5$, and $2.2 \leq y \leq 3.0$).

It is noted that W indicates tungsten and O indicates oxygen in a chemical formula $M_xWO_y$. Also, as described above, an element M in the formula is preferably one or more kinds of elements selected from Cs, Rb, K, Tl, In, Ba, Li, Ca, Sr, Fe, Sn, Al, Cu, and Na.

Figure 2:
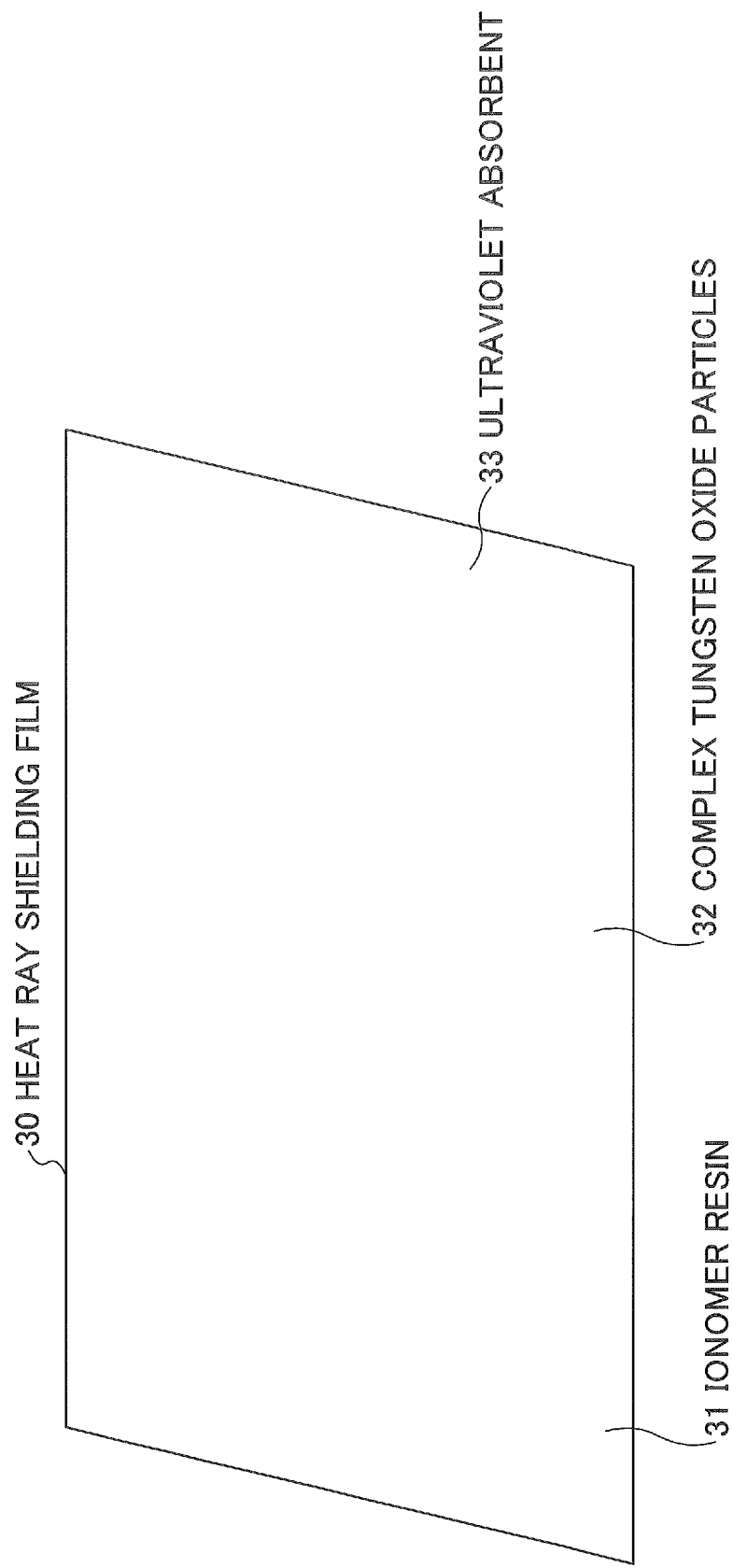
FIG. 2 is a diagram illustrating an example of a heat ray shielding film.

The composite tungsten oxide particles described above have an infrared ray absorbing characteristic. Hence, as illustrated in FIG. 2, by containing composite tungsten oxide particles 32 in a heat ray shielding film 30 of the embodiment, it is possible to suppress light transmission of an infrared region, especially, a near-infrared region, and to accomplish the heat ray shielding performance. Also, an optical absorption coefficient in a visible region is very small compared to the optical absorption in the near-infrared region. Hence, it is possible to maintain high permeability with respect to light in the visible region, even if the light transmission of the near-infrared region is sufficiently suppressed.

The composite tungsten oxide is expressed by $M_xWO_y$ as described above, and has a composition adding the element M to the tungsten oxide ($M_xWO_y$).

According to examinations of the inventors of the present invention, the tungsten oxide ($WO_y$) also has the infrared ray absorbing characteristic. In a case of the tungsten oxide, there is no effective free electron in tungsten trioxide ($WO_3$). Thus, there is less absorption characteristic of the near-infrared region. However, by setting y representing a ratio of oxygen to tungsten of the tungsten oxide ($WO_y$) to be less than 3, it is possible to generate free electrons in the tungsten oxide, and effective infrared absorbing particles are formed in the tungsten oxide. However, a crystal phase of $WO_2$ may cause absorption and dispersion of light in the visible region and reduces the optical absorption in the near-infrared region.

In a case of the particles of the tungsten oxide, y in the chemical formula expressed by $WO_y$ satisfies $2.2 \leq y < 3.0$. Hence, it is possible to suppress an occurrence of the crystal phase of $WO_2$, and to realize infrared absorbing particles.

Also, in a case of the particles of the tungsten oxide, a so-called "Magneli phase", which has a composition ratio represented by $2.45 \leq y < 3.0$ is chemically stable. Since an optical absorption characteristic in the near-infrared region is also preferable, it is possible to preferably use the particles of the tungsten oxide as the infrared absorbing particles.

In a case of the composite tungsten oxide used for the heat ray shielding film of the embodiment, by adding the element M to the tungsten oxide, the free electrons are generated in the composite tungsten oxide, a further absorption characteristic derived from the free electrons in the near-infrared region is reached. Hence, the composite tungsten oxide shows a superior characteristic as an infrared absorbing material, which absorbs a near-infrared ray.

Regarding the composite tungsten oxide, by using in combination of controlling an oxygen content described related to the tungsten oxide and of adding the element M generating the free electron, it is possible to realize a further effective and superior infrared absorbing material. In a case of using in combination of controlling the oxygen content and adding the element M generating the free electron, it is preferable to satisfy a relationship between $0.1 \leq x \leq 0.5$ and $2.2 \leq y \leq 3.0$ in the chemical formula $M_xWO_y$ representing the composite tungsten oxide.

Here, a value of x representing an addition amount of the element M in the chemical formula of the above described composite tungsten oxide will be described. It is a preferable case in which the value of x is greater than or equal to 0.1, since a sufficient amount of the free electrons is generated. It is possible to obtain a desired infrared absorption effect. The greater the addition amount of the element M is, the more a supply amount of the free electron is increased and the more infrared absorption efficiency is increased. However, the effect is saturated when the value of x is approximately 0.5. If the value of x is less than or equal to 0.5, it is also preferable, since it is possible to avoid generating the impurity phase in the infrared absorbing material.

Next, a value of y representing the control of the oxygen amount will be described. Regarding the value of y, a similar mechanism to the above described tungsten oxide ($WO_y$) works in the infrared absorbing material represented by $M_xWO_y$. In addition, the free electrons with the addition amount of the described above element M are supplied even if y=3.0. Hence, $2.2 \leq y \leq 3.0$ is preferable. Especially, since as described for the tungsten oxide, since a further chemical stability is realized, $2.45 \leq y \leq 3.0$ is further preferable.

The crystal structure of the composite tungsten oxide contained in the composite tungsten oxide particles is not specifically limited. The composite tungsten oxide having any crystal structure may be contained. However, it is a preferable case in that the composite tungsten oxide contained in the composite tungsten oxide particles has a hexagonal crystal structure, since a light transmittance of the visible region of the particles and the optical absorption of the near-infrared region are especially improved.

FIG. 1 illustrates a schematic plane view of the hexagonal crystal structure. In FIG. 1, six octahedrons formed by $WO_6$ units represented by numerals 11 are collected together and form hexagonal voids (tunnels). Then, in the voids, the elements M indicated by numerals 12 are arranged to form one unit. Multiple of these units are collected together and form the hexagonal crystal structure.

As described above, in a case in which the composite tungsten oxide particles contain the composite tungsten oxide, in which the six octahedrons formed by $WO_6$ units are collected together and the hexagonal void is formed, and which includes a unit structure where the element M is disposed in the void, it is possible to especially improve the light transmittance of the visible region and the optical absorption of the near-infrared region. It is noted that it is not necessary for the entire composite tungsten oxide particles to be formed by a crystalline composite tungsten oxide having the structure illustrated in FIG. 1. For instance, even if the structure is locally included, it is possible to acquire an effect of improving of the light transmittance of the visible region and the optical absorption of the near-infrared region. Accordingly, the composite tungsten oxide particles may be crystalline or amorphous as a whole.

Also, as the element M of the composite tungsten oxide, the above described hexagonal crystal is easily formed when the element M having a larger ionic radius is added. In detail, the hexagonal crystal is easily formed when one or more kinds of Cs, Rb, K, and Tl, for instance, is added as the element M. It is preferable for the element M to contain one or more kinds of Cs, Rb, K, and Tl. It is noted that in order to forming the hexagonal crystal, for other elements, the element M may exist in the void of the hexagonal crystal formed by the $WO_6$ units. Hence, it is not limited to a case of adding the element as the element M.

In a case in that the crystal structure of the composite tungsten oxide contained in the composite tungsten oxide particles is formed as a homogeneous hexagonal crystal, it is preferable that the value of x representing the addition amount of the element M satisfies $0.20 \leq x \leq 0.50$. It is further preferable that $0.25 \leq x \leq 0.40$ is satisfied. Regarding y, as described above, $2.2 \leq y \leq 3.0$ is preferable. It is noted that the value of x is 0.33 when y=3.0, and thus, it is considered that the element M is disposed in all hexagonal voids.

Also, the composite tungsten oxide contained in the composite tungsten oxide particles may have a tetragonal structure or a cubic tungsten bronze structure other than the above describe hexagonal structure. The composite tungsten oxide having the structure is also effective as the infrared absorbing material. That is, it is possible to preferably use it as a material contained in the composite tungsten oxide particles added to the heat ray shielding film. Due to the crystal structure of the composite tungsten oxide, an absorbing position of the near-infrared region tends to be changed. For instance, the absorbing position of the near-infrared region shifts to a longer wavelength in a case of the cubic crystal more than the tetragonal crystal. In a case of the hexagonal crystal, the absorbing position of the near-infrared region tends to shift to the longer wavelength more than the tetragonal crystal. Also, accompanying fluctuation of the absorbing position, the optical absorption of the visual region is the least for the hexagonal crystal, and the tetragonal crystal is next. The optical absorption of the visual region is the most for the cubic crystal among these structures. Accordingly, when a high light emittance of the visible region and a high light absorptivity of the near-infrared region are desired, the hexagonal tungsten bronze structure is suitably used. However, tendencies of optical characteristics are roughly described here. These tendencies are changed depending on the kind of an added element M, the addition amount, and the oxygen amount. Hence, the material of the infrared absorbing particles used for the heat ray shielding film of the embodiment is not limited to the material of the hexagonal crystal.

The crystal structure of the composite tungsten oxide contained in composite tungsten oxide particles, which can be used for the heat ray shielding film of the embodiment, is not limited to the above described structure. For instance, the composite tungsten oxide having a different crystal structure may be contained together.

However, as described above, the particles of the composite tungsten oxide improve the transmittance of visible light and the light absorption of the near-infrared region. Hence, for the composite tungsten oxide of the composite tungsten oxide particles contained in the heat ray shielding film of the embodiment, it is preferable for a crystal system to be hexagonal.

Also, in a case of using Cs and/or Rb, for instance, as the element M, the crystal structure of the composite tungsten oxide easily becomes hexagonal. Furthermore, since the light transmittance of the visible region is high and the light transmittance of the infrared region, especially, the near-infrared region becomes lower, a contrast between the light transmittance of the visible region and the light transmittance of the infrared region becomes greater. Therefore, it is preferable for the element M of the general formula $M_xWO_y$, representing to the composite tungsten oxide to be Cs and/or Rb. Specifically, when the element M contains Cs, a higher weather resistance of the composite tungsten oxide is acquired. Thus, it is particularly preferred for the element M to contain Cs.

A particle size of the composite tungsten oxide is not specifically limited, and is arbitrary determined depending on an application using the heat ray shielding film. For instance, especially, in a case of using the heat ray shielding film to use for an application in which higher transparency is desired for light of the visible region, the composite tungsten oxide particles are preferably fine particles. Preferably, volume average particle diameters of the composite tungsten oxide particles are smaller than or equal to 100 nm. This is because it is possible to suppress shielding light due to light scattering, and the transparency is effectively maintained simultaneously while maintaining a visibility in the visible region, when the volume average particle diameters of the composite tungsten oxide particles smaller than or equal to 100 nm.

It is noted that the volume average particle diameter indicates a grain diameter with an integrated value 50% in a size distribution acquired by a laser diffraction scattering method. In the specification of this application, the volume average particle diameter is used as the same meaning in the other parts.

Also, for instance, in a case in which the heat ray shielding film of the embodiment is used especially for an application counting the transparency of the visible region such as a vehicle roof, a side window, and the like, it is further preferable to consider to reduce scattering of the composite tungsten oxide particles. In order to consider further reduction of the scattering, it is preferable for the volume average particle diameters of the composite tungsten oxide particles to be less than or equal to 40 nm. It is further preferable to be less than or equal to 30 nm. It is especially preferable to be less than or equal to 25 nm.

By reducing the volume average particle diameters of the composite tungsten oxide particles, it is possible to reduce dispersion of the light of a wavelength of 400 nm to 780 nm in the visible region due to a geometric scattering or a Mie scattering. By reducing the scattering of the light of the wavelength, an appearance of the heat ray shielding film becomes a cloudy glass when a strong light is illuminated, and it is possible to avoid a situation losing a clear transparency.

When the volume average particle diameters of the composite tungsten oxide particles become less than or equal to 40 nm, the geometric scattering or the Mie scattering described above are reduced, and a Rayleigh scattering region is formed. In the Rayleigh scattering region, since a scattered light is reduced in an inverse proportion to the particle size of the sixth power, the scattering is reduced with a decrease of a dispersed particle diameter and the transparency is improved. Moreover, when the volume average particle diameters of the composite tungsten oxide particles become less than or equal to 30 nm, especially less than or equal to 25 nm, the scattered light preferably becomes very little.

As described above, in view of avoiding dispersion of the light, it is preferable for the volume average particle diameters of the composite tungsten oxide particles to be smaller. However, when the volume average particle diameters of the composite tungsten oxide particles are too small, there is a case in which aggregation is caused in the heat ray shielding film or a case in which it becomes difficult to handle when manufacturing the heat ray shielding film. Accordingly, it is preferable for the volume average particle diameters of the composite tungsten oxide particles to be greater than or equal to 1 nm.

An amount (content) of the composite tungsten oxide particles contained in the heat ray shielding film is not limited, and may be optionally selected depending on a level of a heat ray shielding performance required to the heat ray shielding film, a degree of the visual ray transmittance, and the like. For instance, the content of the composite tungsten oxide particles of the heat ray shielding film per unit area in a projection area of the heat ray shielding film is preferably greater than or equal to 0.05 $g/m^2$ and less than or equal to 5.0 $g/m^2$, and is further preferably greater than or equal to 0.1 $g/m^2$ and less than or equal to 2.0 $g/m^2$.

(2) Ionomer Resin

The ionomer resin is not specifically limited, and various known ionomer resins can be used. A resin may be optionally selected depending on a use application of the heat ray shielding film. For instance, as an ionomer resin 31 illustrated in FIG. 2, an ethylene-based ionomer, a styrene type ionomer, an ionomer elastomer, a perfluorocarbon ionomer, an urethane ionomer, and the like are known. As described above, any ionomer resin may be selected depending on a use, a required performance, and the like as described above. Also, only one kind of the ionomer resin 31 used for the heat ray shielding film 30 may be used. Alternatively, two or more ionomer resins 31 may be combined to be used.

Specifically, the heat ray shielding film of the embodiment, or a laminated transparent substrate using the heat ray shielding film described below may be suitably used as a window material of a vehicle or a building, a film of a greenhouse, and the like, for instance. Therefore, it is preferable for the ionomer resin contained in the heat ray shielding film to have a superior transparency, a high visible light transmittance and a low haze value, a superior penetration resistance, and a superior weather resistance. In a case in which the heat ray shielding film is arranged on a transparent substrate, a superior adhesion to the transparency substrate is preferable.

From the above viewpoint, it is preferable for the ionomer resin to contain the ethylene-based ionomer. Especially, it is further preferable for the ionomer resin to be the ethylene-based ionomer.

Also, the metal ions contained in the ionomer resin are not specifically limited. For instance, the ionomer resin containing the metal ion formed of one or more of zinc, magnesium, lithium, potassium, and sodium. Specifically, the ionomer resin containing zinc ions may be suitably used.

In detail, as the ionomer resin, for instance, metallic element ionomer of ethylene/acrylic acid/acrylic acid ester copolymer, metallic element ionomer of ethylene/acrylic acid/methacrylic acid ester copolymer, metallic element ionomer of ethylene/methacrylic acid/acrylic acid ester copolymer, metallic element ionomer of ethylene/methacrylic acid/methacrylic acid ester copolymer, and the like may be listed. It is noted that the metal ion contained in any of the above listed ionomer resins is not limited. For instance, one or more metal ions selected from zinc, magnesium, lithium, potassium, and sodium.

In detail, for instance, as the ionomer resin, Surlyn (registered trademark) series of Du Pont, Hi-Milan (registered trademark) series of Du Pont-Mitsui Polychemicals Co., Ltd., Hi-Milan (registered trademark) series of Du Pont-Mitsui Polychemicals Co., Ltd., or the like may be suitably used.

(3) Other Components

To the heat ray shielding film of the embodiment, a component other than the composite tungsten oxide and the ionomer resin is optionally added. An optionally added component will be described below.

To the heat ray shielding film of the embodiment, a dispersant may be added in order to uniformly disperse the above described composite tungsten oxide particles into the ionomer resin.

The dispersant is not specifically limited and may be optionally selected depending on a manufacturing condition and the like of the heat ray shielding film. For instance, a preferable dispersant is one in that a thermal decomposition temperature measured by a simultaneous measuring device for differential heat and thermal gravitation (hereinafter, may be called TG-DTA) is greater than or equal to 250° C., and the dispersant contains a main chain selected from an urethane main chain, an acrylic main chain, and a styrene main chain or a main chain in that two or more unit structures selected from the urethane, the acrylic, and the styrene are copolymerized. The thermal decomposition temperature is temperature where a weight loss begins due to pyrolysis of the dispersant in a measurement using TG-DTA in conformity to JIS K 7120.

In a case in which the thermal decomposition temperature of the dispersant is greater than or equal to 250° C., the dispersion is suppressed to be decomposed when kneading with the ionomer resin, and brown coloring of the heat ray shielding film caused by decomposition of the dispersion, decrease of the visible light transmittance, and the like are suppressed. Thus, it is possible to more reliably avoid situations where optical characteristics can not be obtained.

Also, it is preferable for the dispersant to contain, as a functional group, one or more kinds selected from an amine containing group, a hydroxyl group, a carboxyl group, or an epoxy group. The dispersion containing either one of the above described functional groups is adhered to a surface of the composite tungsten oxide particles, so as to avoid aggregating the composite tungsten oxide particles and uniformly disperse the composite tungsten oxide particles in the heat ray shielding film. Hence, the dispersant can be suitably used.

As the dispersant containing either one of the functional groups, in detail, for instance, an acryl styrene copolymer type dispersant containing the carboxyl group as the functional group, an acrylic dispersant containing a group including an amine as the functional group, and the like may be considered. The dispersion including the group containing the amine in the functional group may preferably have a molecular weight from 2000 Mw to 200000 Mw and an amine value from 5 mgKOH/g to 100 mgKOH/g and an acid value from 1 mgKOH/g to 50 mgKOH/g.

The addition amount of the dispersant is not specifically limited. For instance, it is preferable to add the dispersant of greater than or equal to 10 parts by mass and less than or equal to 1000 parts by mass with respect to 100 parts by mass of the composite tungsten oxide particles. It is preferable to add the dispersant of greater than or equal to 30 parts by mass and less than or equal to 400 parts by mass.

If the addition amount of the dispersant falls in the above described range, the composite tungsten oxide particles can be more reliably and uniformly dispersed in the ionomer resin. Hence, an acquired physical characteristic of the heat ray shielding film is not adversely influenced.

Also, as illustrated in FIG. 2, the heat ray shielding film 30 of the embodiment further contains an ultraviolet absorbent 33.

As described above, since the composite tungsten oxide particles are added to the heat ray shielding film of the embodiment, mainly, it is possible to suppress the light transmission of the near-infrared region. Therefore, it is possible to suppress heat ray transmission, and to suppress temperature increase of an inside area where the heat ray shielding film is disposed.

By further adding an ultraviolet absorbent to the heat ray shielding film, it is possible to further cut light of an ultraviolet region, and to especially improve a suppression effect of the temperature increase. Also, by adding the ultraviolet absorbent to the heat ray shielding film of the embodiment, for instance, it is possible to sufficiently prevent an influence of an ultraviolet ray, sunburn, deterioration of furniture and interiors, and the like with respect to peoples, interiors, and the like inside the vehicle and the building where the heat ray shielding film is applied. Moreover, the dispersion, in which the composite tungsten oxide particles are dispersed in the resin, may reduce its transmittance due to a long term exposure of the strong ultraviolet ray. However, it is possible to suppress a reduction of the transmittance by adding the ultraviolet absorbent to the heat ray shielding film of the embodiment.

The ultraviolet absorbent is not specifically limited, and may be optionally selected depending on the influence on the visual ray transmittance of the heat ray shielding film and the like, an ultraviolet absorptivity, a durability, and the like. For instance, the ultraviolet absorbent may be one of an organic-based ultraviolet light-absorbing agent such as a benzophenone compound, a salicylic acid compound, a benzotriazole, a triazine compound, benzotriazoly compound, a benzoyl compound, or the like, an inorganic-based ultraviolet light-absorbing agent such as zinc oxide, titanium oxide, cerium oxide, or the like. Especially, it is preferable for the ultraviolet absorbent to contain one or more kinds selected from the benzotriazole and the benzophenone compound. The benzotriazole and benzophenone compound improve the visual ray transmittance of the heat ray shielding film even in a case of adding concentration sufficiently absorbing the ultraviolet ray, and has high durability with respect to the long term exposure of the strong ultraviolet ray.

Also, for instance, it is preferable for the ultraviolet absorbent to contain chemical components represented by chemical formula 1 and/or chemical formula 2 as follows:

[Chemical Formula 1]

(CHEMICAL FORMULA 1)

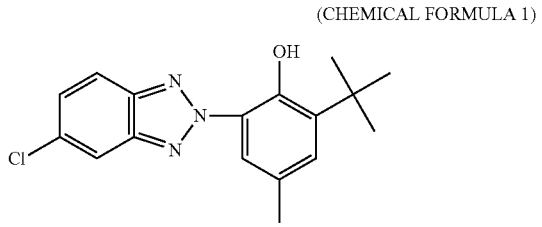

[Chemical Formula 2]

(CHEMICAL FORMULA 2)

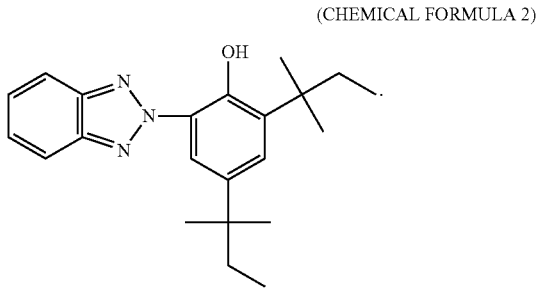

A content rate of the ultraviolet absorbent in the heat ray shielding film is not specifically limited, and may be optionally selected depending on the visual ray transmittance, an ultraviolet ray shielding ability, and the like required for the heat ray shielding film. For instance, if the content rate of the ultraviolet absorbent in the heat ray shielding film is preferably greater than or equal to 0.02 mass % and less than or equal to 5.0 mass %, it is possible to sufficiently absorb the ultraviolet ray, which is not absorbed by the composite tungsten oxide particles. In addition, if the content rate is less than or equal to 5.0 mass %, the ultraviolet absorbent is not deposited in the heat ray shielding film, and a strength, an adhesion force, and a penetration resistance of the film are not influenced.

Also, the heat ray shielding film of the embodiment may further contain HALS (hindered amine light stabilizer).

As described above, by adding the ultraviolet absorbent, it is possible to improve an ultraviolet absorbability. However, depending on an environment where the heat ray shielding film of the embodiment is used or a type of the ultraviolet absorbent, the ultraviolet absorbent is deteriorated accompanying a long term use. Contrary, by adding HALS, it is possible to prevent the ultraviolet absorbent to deteriorate, and to contribute to a duration of the ultraviolet absorbability of the heat ray.

Also, as described above, the transmittance of the dispersion, in which the composite tungsten oxide particles are dispersed in the resin, may be degraded due to the long term exposure of the strong ultraviolet rays. However, by adding the HALS to the heat ray shielding film of the embodiment, it is possible to suppress the decrease of the transmittance.

Moreover, in the HALS, there are compounds that themselves have an absorption capability of the ultra violet ray. In this case, by adding the compounds of interest, both the above described effect acquired by adding the ultraviolet absorbent and an effect acquired by adding the HALS can be realized.

The HALS is not specifically limited, and may be optionally selected depending on the influence on the visual ray transmittance of the heat ray shielding film and the like, compatibility of the ultraviolet absorbent, the durability, and the like. For instance, a polycondensate of bis (2,2,6,6-tetramethyl-4-piperidyl) sebacate, bis (1,2,2,6,6-pentamethy-4-piperidyl) sebacate, 1-[2-(3,5-t-butyl-4-hydroxyphenyl) propionyloxy] ethyl]-4-[3-(3,5-di-t-butyl-4-hydroxyphenyl) propionyl oxy]-2,2,6,6-tetramethylpiperidine, 4-benzoyloxy-2, 2, 6, 6-tetramethylpiperidine, 8-acetyl-3-dodecyl-7,7,9,9-tetramethyl-1,3,8-triazaspiro [4,5] decane-2,4-dione, bis-(1,2,2,6,6-pentamethyl-4-piperidyl)-2-3,5-di-t-butyl-4-hydroxybenzyl)-2-n-butylmalonate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylate, (mixed 1,2,2,6,6-pentamethyl-4-piperidyl/tridecyl)-1,2,3,4-butanetetracarboxylate, mixed{1,2,2,6,6-pentamethyl-4-piperidyl/β,β,β',β'-tetramethyl-3,9-[2,4,8,10-tetraoxaspiro(5,5)undecane] diethyl}-1,2,3,4-butanetetracarboxylate, (mixed 2,2,6,6-tetramethyl-4-piperidyl/tridecyl)-1,2,3,4-butanetetracarboxylate, mixed{2,2,6,6-tetramethyl-4-piperidyl/β,β,β',β'-tetramethyl-3,9-[2,4,8,10-tetraoxaspiro(5,) undecane] diethyl}-1,2,3,4-butanetetracarboxylate, 2,2,6,6-tetramethyl-4-piperidyl methacrylate,1,2,2,6,6-pentamethyl-4-piperidyl methacrylate, poly [(6-(1,1,3,3-tetramethylbutyl)imino-1,3,5-triazine-2,4-diyl)] [(2,2,6,6-tetramethyl-piperidyl)imino] hexamethylene [(2,2,6,6-tetramethyl-4-piperidyl) iminol], dimethylsuccinate polymer-wh-4-hydroxy-2,2,6,6-tetramethyl-1-piperidineethanol, tetrakis-(4,6-bis-(butyl-(N-methyl-2,2,6,6-tetramethylpiperidin-4-yl) amino)-N,N',N",N' Triazin-2-yl)-4,7-diazadecane-1,10-diamine, and Dibutylamine-1,3,5-triazine-N, N'-bis (2,2,6,6-tetramethyl-4-piperidyl-1,6-hexamethylenediamine and N-(2,2,6-6-tetramethylpiperidyl) butylamine, and decanedioic acid bis (2,2,6,6-tetramethyl-1-(octyloxy)-4-piperidinyl) ester may be suitably used.

The content rate of the HALS in the heat ray shielding film is not specifically limited, and may be optionally selected depending on the visual ray transmittance and the weather resistance required for the heat ray shielding film. For instance, it is preferable for the content rate of the HALS in the heat ray shielding film to be greater than or equal to 0.05 mass % and less than or equal to 5.0 mass %. In this case, if the percent of the HALS is greater than or equal to 0.05 mass %, the effect of adding the HALS is fully demonstrated in the heat ray shielding film. Also, if the content rate is less than or equal to 5.0 mass %, the HALS is not deposited in the heat ray shielding film, and a strength, an adhesion force, and a penetration resistance of the film are not influenced.

The heat ray shielding film of the embodiment may further contain an oxidation inhibitor (antioxidant).

As described above, the ionomer resin has the high weather resistance, and it is possible to suppress the oxidative deterioration of the resin, and to further improve the weather resistance by adding the oxidation inhibitor. Also, it is possible to suppress the oxidative deterioration of another additive contained in the resin, for instance, the composite tungsten oxide particles, the ultraviolet absorbent, the HALS, and a dye compound, an infrared absorbable material, a coupling agent, a surfactant, a antistatic agent, and the like which will be described later, and to improve the weather resistance.

The oxidation inhibitor is not specifically limited, and may be optionally selected depending on an influence on visual ray transmittance, a desired weather resistance, and the like of the heat ray shielding film. For example, a phenolic antioxidant, a phenolic antioxidant, phosphor-containing antioxidant, and the like may be suitably used. Moreover, in detail, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-Methylenebis-(4-methyl-6-butylphenol), 4,4'-butylidene-bis-(3-methyl-6-t-butylphenol), 1,1,3-tris-(2-methyl-hydroxy-5-t-butylphenyl) butane, tetrakis[methylene-3-(3',5'-butyl-4-hydroxyphenyl) propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl) benzene, bis (3,3'-t-butylphenol) butyric acid glycol ester, triphenylphosphine, bis-(diphenylphosphinoethane), trinaphthylphosphine, tris (2,4-di-tert-butylphenyl) phosphite, and the like may be suitably used.

The content rate of the oxidation inhibitor in the heat ray shielding film is not specifically limited, and may be optionally selected depending on the visual ray transmittance, the weather resistance, and the like required for the heat ray shielding film. For instance, the content rate of the oxidation inhibitor in the heat ray shielding film is suitably greater than or equal to 0.05 mass % and less than or equal to 5.0 mass %. If the content rate of the oxidation inhibitor is greater than or equal to 0.05 mass %, it is possible to sufficiently accomplish the effect due to addition of the oxidation inhibitor. Also, if the content rate is less than or equal to 5.0 mass %, the oxidation inhibitor in the heat ray shielding film does not deposit. In addition, the strength and the adhesion force of the film and the penetration resistance are not greatly influenced.

In the above, as an optional additive component, the dispersant, the ultraviolet absorbent, the HALS, and the oxidation inhibitor are described. Other various additives may be added.

For instance, in order to apply a desired color tone, an azo dyes, a cyanine type dye, a quinoline series, a perylene dye, a carbon black, and the like, the dye compound, and a pigment compound used to color the ionomer resin may be added.

Also, in order to acquire a further heat ray shielding performance, it is possible to add another infrared absorbable material. The another infrared absorbable material is not specifically limited. It is preferable to use a material capable of absorbing light having a different wavelength region from the composite tungsten oxide particles to be used. As another infrared absorbable material, for instance, the infrared absorbing organic compound is suitably used. By adding the infrared absorbing organic compound, a further heat ray shielding performance is acquired.

As another additive, for instance, a coupling agent, a surfactant, an antistatic agent, and the like may be added.

Also, the heat ray shielding film of the embodiment improves mechanical, chemical, or optical properties such as the penetration resistance, the weather resistance, the transparency, and the like. Moreover, an adhesion to the transparent base material is improved in a case of disposing the heat ray shielding film on the transparent base material. Hence, another resin material other than the ionomer resin may be contained.

In this case, a type of the resin to add further to the ionomer resin is not specifically limited. For instance, any type of a resin material may be used, if the resin material has a preferable compatibility with the ionomer resin to use, and does not impair characteristic physical properties such as transparency and the like. For instance, an ethylene/unsaturated carboxylic acid copolymer, an ethylene/unsaturated ester/unsaturated carboxylic acid copolymer, and the like may be used. Especially, the resin material having a higher melting point than the ionomer resins improves the weather resistance of the heat ray shielding films and a stability at a thermal processing.

As described above, it is preferable for the heat ray shielding film of the embodiment to have a high transparency and a high heat ray shielding performance. The transparency and the heat ray shielding performance, that is, a thermal barrier property of the heat ray shielding film are evaluated by the visual ray transmittance and the sunlight transmittance, respectively.

Degrees of the transparency and the heat ray shielding performance required to the heat ray shielding film of the embodiment are not specifically limited, and may preferably have performances depending on an application and the like of the heat ray shielding film.

In detail, for instance, in a case of using the application of the window material or the like, a high visual ray transmittance is preferable in view of maintaining the permeability of the light for human eyes. A lower sunlight transmittance is preferable in view of reducing a heat incidence due to a sunlight.

Alternatively, in a case of using the heat ray shielding film and the laminated transparent base material of the embodiment, the high visual ray transmittance is preferable in view of maintaining the transmittance of the visual light necessary for a plant growth. The sunlight transmittance is preferable in view of reducing the heat incidence due to the sunlight.

More specifically, for instance, in a case of using the laminated transparent base material containing the heat ray shielding film of the embodiment for the windows of the building and the vehicle, the heat ray shielding film is preferably 70% or more of the visual ray transmittance and is preferably 40% or less of the sunlight transmittance. Especially, the visual ray transmittance is preferably greater than or equal to 70% and the sunlight transmittance is preferably less than or equal to 40%. It is noted that the visual ray transmittance and the sunlight transmittance are regulated by JIS R 3106.

For instance, desired ranges may be set to the visual ray transmittance and the sunlight transmittance by adjusting the addition amount such as the composite tungsten oxide particles or the like, for instance, contained in the heat ray shielding film of the embodiment.

Also, it is possible to suppress the color reducing phenomena by containing the ionomer resin in the heat ray shielding film of the embodiment. For instance, a degree to suppress the color reducing phenomena may be evaluated by changing the total light transmittance after standing for a long time in an environment of high temperature and high humidity. For instance, the heat ray shielding film of the embodiment is preferably less than or equal to 3% of a change of a value of the total light transmittance before and after standing for 24 hours in an environment of 85° C. temperature and 90% relative humidity. The heat ray shielding film of the embodiment is more preferably less than or equal to 1% of the change. The total light transmittance is regulated by JIS K 7361-1.

According to the heat ray shielding film of the embodiment, by containing the ionomer resin, the high weather resistance is realized. Hence, the heat ray shielding film of the embodiment is exposed, and it is possible to suppress the occurrence of the color reducing phenomena even in a case of being placed under the environment of the high temperature and the high humidity. Then, it is possible to maintain a high transmittance of the light of the visible region and a low sunlight transmittance, and to suppress damaging the appearance of the heat ray shielding film and reducing the heat ray shielding performance.

Also, since the heat ray shielding film of the embodiment contains the composite tungsten oxide particles as the particles of the infrared absorption, it is possible to maintain the high visible light and to accomplish the high heat ray shielding performance. Hence, for instance, in a case of applying the heat ray shielding film to the windows of the vehicle and the building, it is possible to improve an amenity inside the vehicle and the building, to reduce a load of an air condition inside the vehicle and improve a fuel economy of the vehicle. Moreover, it is possible to save energy by reducing the load of the air condition inside the vehicle.

A use of the heat ray shielding film of the embodiment is not specifically limited. For instance, a single heat ray shielding film itself may be used. In a case of using the heat ray shielding film as a single material, for instance, the heat ray shielding film may be used as a film for covering an outside surface of the greenhouse, a film for sectioning an area to suppress the transmission of the heat ray.

Also, the heat ray shielding film of the embodiment may be used by being deployed on one side or both side of an inorganic glass and the transparent base materials such as a clear resin. Specifically, for instance, the heat ray shielding film of the embodiment may be used by laminating one or both main planes of one transparent base material.

As another aspect, the heat ray shielding film of the embodiment may be disposed between multiple sheets of the transparent base materials facing each other, and may be used as a heat ray shielding laminated transparent base material. The heat ray shielding laminated transparent base material will be described.

(Manufacturing Method of Heat Ray Shielding Film)

Next, a configurational example of a manufacturing method of the heat ray shielding film of the embodiment will be described. It is noted that by the manufacturing method of the heat ray shielding film of the embodiment, the above described heat ray shielding film is suitably manufactured. Other than explanations below are similar to a case of the above described heat ray shielding film, and thus explanations thereof will be omitted.

The manufacturing method of the heat ray shielding film of the embodiment is not specifically limited. For instance, the following processes are included.

dispersion liquid manufacturing process for manufacturing dispersion liquid in which the composite tungsten oxide particles and the dispersant are dispersed in an organic solvent.

dispersion manufacturing process for manufacturing a composite tungsten oxide particle dispersion in a state, in which the composite tungsten oxide particles are dispersed in a solid dispersant by eliminating an organic solvent in the dispersion liquid manufactured in the dispersion liquid manufactured in the dispersion liquid manufacturing process.

kneading process for kneading the composite tungsten oxide particle dispersion acquired in the dispersion manufacturing process, and the ionomer resin.

molding process for molding a kneaded product with the composite tungsten oxide particle dispersion and the ionomer resin. Instead of conducting the dispersion manufacturing process, the dispersion liquid manufactured in the dispersion liquid manufacturing process may be supplied to the kneading process. In the kneading process, the composite tungsten oxide particle dispersion liquid and the ionomer resin are kneaded. In this case, in the kneading process, the composite tungsten oxide particles are uniformly dispersed in the ionomer resin, and the organic solvent is simultaneously eliminated. In view of firmly to prevent a large amount of the organic solvent and bubbles from remaining in the heat ray shielding film, and in view of preventing a large amount of the organic solvent at a high temperature of a kneaded resin higher than 200° C., it is preferable to conduct the dispersion liquid manufacturing process prior to the kneading process.

Each of the processes will be described.

First, the dispersion liquid manufacturing process will be described.

In the dispersion liquid manufacturing process, the composite tungsten oxide particles and the dispersant are added and mixed in the organic solvent, and the organic solvent dispersion liquid of the composite tungsten oxide particles are acquired by using a general dispersion method. The dispersion method is not specifically limited. For instance, the dispersion method such as a bead mill, a ball mill, a sand mill, an ultrasonic dispersion, a paint shaker, and the like may be used.

The composite tungsten oxide particles and the dispersant, which are suitably used in the dispersion liquid manufacturing process, are described above for the heat ray shielding film, and explanation thereof will be omitted.

Also, the type of the organic solvent used in the dispersion liquid manufacturing process is not specifically limited. For instance, the organic solvent having a boiling point less than or equal to 120° C. is preferably used. If the boiling point is less than or equal to 120° C., it is possible to easily eliminate the organic solvent in the dispersion manufacturing process being a post-process. Since the eliminating of the organic solvent is promptly proceeded in the dispersion manufacturing process, it is possible to improve productivity of the composite tungsten oxide particle dispersion. Moreover, since the dispersion manufacturing process is easily and fully carried out, it is possible to prevent the organic solvent from excessively remaining in the composite tungsten oxide particle dispersion. As a result, it is possible to firmly avoid an occurrence of defects such as bubbles in the heat ray shielding film in the molding process.

As the organic solvent, specifically, for instance, a toluene, a methyl ethyl ketone, a methyl isobutyl ketone, a butyl acetate, an isopropyl alcohol, an ethanol, and the like may be suitably used. However, the organic solvent is not limited to one of these solvent. A solvent, which has the boiling point 120° C. and in which the composite tungsten oxide particles are uniformly dispersed, may be suitably used.

The addition amount of the organic solvent is not specifically limited. It is possible to optionally select the addition amount so as to form the dispersion liquid depending on the composite tungsten oxide particles and the addition amount of the solvent.

It is noted that the addition amount of the dispersant is not specifically limited as described above. For instance, it is preferable to add the dispersant so as to be greater than or equal to 10 parts by mass and less than or equal to 1000 parts by mass with respect to the composite tungsten oxide particles of 100 parts by mass. It is further preferable to be greater than or equal to 30 parts by mass and less than or equal to 400 parts by mass. It is not necessary to add a total amount of the dispersant in a case of manufacturing the dispersion liquid in the dispersion liquid manufacturing process. For instance, by considering viscosity and the like of the dispersion liquid, after a dispersion liquid is produced by an existing dispersion method, regarding a mixture of a part of a total addition amount of the dispersant, the composite tungsten oxide particles, and the organic solvent, a remaining solvent may be added.

Next, the dispersion manufacturing process will be described.

In the dispersion manufacturing process, an adequate amount of the solvent is added with respect to the dispersion liquid in which the composite tungsten oxide particles and the dispersant are dispersed in the organic solvent, if desired. After that, it is possible to manufacture the composite tungsten oxide particles dispersant by eliminating the organic solvent. A method for eliminating the organic solvent from the dispersion liquid, in which the composite tungsten oxide particles and the dispersant are dispersed in the organic solvent, is not specifically limited. For instance, a drying under reduced pressure may be suitably used. Specifically, the dispersion liquid, in which the composite tungsten oxide particles and the organic dispersant are dispersed, is simultaneously stirred and dried under reduced pressure, so as to separate the composite tungsten oxide particles and the organic dispersant component. For instance, an apparatus used to dry under pressure may be a dryer of a vacuum stirring type, but is not specifically limited. Any apparatus having the above described functions may be used. Also, a vacuum pressure is not specifically limited when eliminating the organic solvent, and may be appropriately selected.

In the dispersion manufacturing process, it is possible to improve an elimination efficiency of the organic solvent by using a vacuuming drying method, and the composite tungsten oxide particle dispersion is not exposed for the long term to high temperature. Thus, it is preferable that the composite tungsten oxide particle dispersion being dispersed are not aggregated. Moreover, the productivity is improved, an evaporated organic solvent is easily collected, and thus, an environmental consideration is preferably realized.

Next, the kneading process will be described.

In the kneading process, the composite tungsten oxide particle dispersion acquired in the dispersion manufacturing process and the ionomer resin are mixed. In this case, if necessary, the ultraviolet absorbent added to the heat ray shielding film, and another additive such as the HALS, the oxidation inhibitor, the infrared absorbing organic compound, or the like may be mixed with together. It is noted that timing of adding these additives is not specifically limited. For instance, these additives may be added in another process such as the dispersion preparation process. The kneading process is not specifically limited. Any known resin kneading process may be optionally selected and used.

Next, the molding process will be described.

The molding process corresponds to a process for molding the mixture acquired in the kneading process, and a molding method is not specifically limited. The molding method is optionally selected depending on a size and a shape of thickness or the like of the heat ray shielding film, the viscosity of the mixture, and the like. For instance, the molding method such as an extrusion process, a calender molding method, and the like may be applied.

Also, the shape of a molding is not specifically limited, and may be optionally selected depending on the shape required for the heat ray shielding film. For instance, it is possible to mold to a film shape.

(Heat Ray Shielding Laminated Transparent Base Material, Manufacturing Method of Heat Ray Shielding Laminated Transparent Base Material, Vehicle, and Building)

Next, a configurational example of the heat ray shielding laminated transparent base material and a manufacturing method of the heat ray shielding laminated transparent base material will be described.

Figure 3:
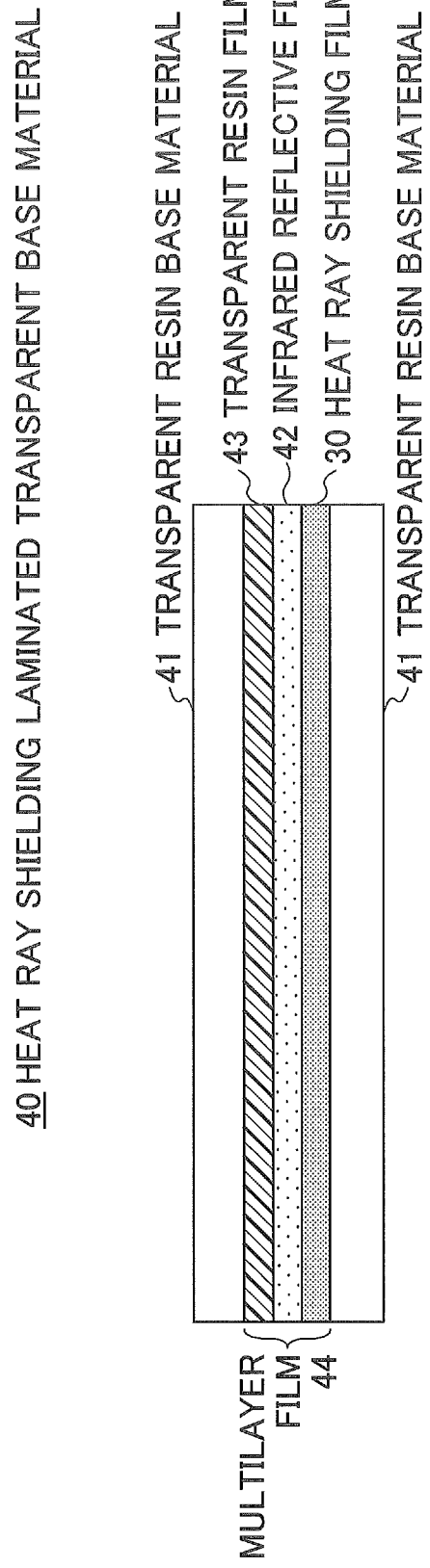
FIG. 3 is a diagram illustrating an example of a heat ray shielding laminated transparent base material.

As illustrated in FIG. 3, it is possible for a heat ray shielding laminated transparent base material 40 of the embodiment to include the above described heat ray shielding film 30. A specific form is not particularly limited. For instance, the heat ray shielding laminated transparent base material 40 may include multiple sheets of transparent base materials 41 and the above described heat ray shielding film 30, and the heat ray shielding film 30 may be disposed between the multiple sheets of the transparent base materials 41.

In this case, a type of the transparent base material to use is not specifically limited, and may be optionally selected depending on an application of the heat ray shielding laminated transparent base material. For instance, a glass base material, various resin base materials, and the like may be suitably used. For the multiple transparent base materials, the same material may be used. Alternatively, different materials may be combined to use.

However, as the base material used for the heat ray shielding laminated transparent base material of the embodiment, in consideration to the weather resistance and a level of the visual ray transmittance, for instance, it is preferable for at least one of the multiple sheets of the transparent base materials to be the glass base material. Also, all of the multiple transparent base materials may be formed of the glass base material. For instance, the heat ray shielding laminated transparent base material using the glass base material of the inorganic glass as the transparent base material (heat ray shielding laminated glass) may be suitably used for the glass for a front of the vehicle and the window of the building.

It is noted that when the heat ray shielding laminated transparent base material includes three or more sheets of the transparent base materials, two or more borders exit among the transparent base materials. In this case, the heat ray shielding film may be disposed at one or more borders selected among the transparent base materials. That is, one or more borders not having heat ray shielding film may exist among the transparent base materials. Also, the heat ray shielding film may be disposed at all borders among the transparent base materials. In a case in which no heat ray shielding film is disposed among the transparent base materials, a configuration at the borders among the transparent base materials may not be specifically limited. For instance, an intermediate film, which has a different function from the heat ray shielding film, may be disposed. A vacuum may be formed at each of the borders. Alternatively, it is possible to improve insulation efficiency by filling gas having a low heat conductivity.

Also, the heat ray shielding film may be disposed alone among the multiple transparent base materials. As described later, a multilayer film may be formed of the heat ray shielding film and another film, and then, may be disposed among the transparent base materials.

For instance, the heat ray shielding laminated transparent base of the embodiment may be acquired by bonding and integrating the multiple sheets of the transparent base materials, in which the above described heat ray shielding film is sandwiched to be placed, by a known method.

In a case of manufacturing the heat ray shielding laminated transparent base, one or more optional intermediate films may such as other resin intermediate films may be sandwiched with the above described heat ray shielding film among the multiple transparent base materials. For instance, as another intermediate film, an intermediate film having a function adjusting an ultraviolet cut, a sound insulator, a tone of color, and an adhesive force may be used, so as to realize the heat ray shielding laminated transparent base having a higher function. It is noted that the above described heat ray shielding film of the embodiment contains the ionomer resin. The resin contained in the other intermediate film is not limited, and may be formed of a resin other than the ionomer resin.

Furthermore, the heat ray shielding laminated transparent base may be one combining the above described heat ray shielding film and an infrared reflective film. That is, at least one piece of the infrared reflective film may be further disposed among the multiple sheets of the transparent base materials.

As illustrated in FIG. 3, in a case of combining the heat ray shielding film 30 and the infrared reflective film 42, for instance, the infrared reflective film 42 may be sandwiched between the heat ray shielding film 30 of the embodiment and a transparent resin film 43 to be integrated, so as to form the multilayer film 44. After that, the multilayer film 44 including the infrared reflective film 42 and the heat ray shielding film 30 of the embodiments may be sandwiched between transparent resin base materials 41 such as the glass base materials the inorganic glasses, or the like, and may be bonded and integrated by the known method, so as to form the heat ray shielding laminated transparent base material 40.

In this case, a position relationship between the film including the infrared reflective film and the heat ray shielding film is not specifically limited, and may be optionally selected depending on the environment or the like to be used. For instance, in a case of using the heat ray shielding laminated transparent base to the windows of the vehicle, and the building, and the like, in consideration to an effect of suppressing an increase of the temperature inside the vehicle and a house, it is preferable to position the infrared reflective film outside the heat ray shielding film.

A property of the infrared reflective film described above is not specifically limited, and may be optionally selected depending on the performance required for a case of the heat ray shielding laminated transparent base.

However, in view of the heat ray shielding performance, in a case of bonding the infrared reflective film to the transparent base material, it is preferable to reflect the light, mainly, from a long wavelength region to a near-infrared region, for instance, a wavelength in a range from 700 nm to 1200 nm.

As described above, by strongly reflecting, by the infrared reflective film, a wavelength of 700 nm to 1200 nm where the optical absorption by the composite tungsten oxide particles is relatively weak, it is possible for the composite tungsten oxide and the infrared reflective film to complementarily and widely shield a region of the near-infrared ray. Therefore, it is possible to improve a shielding property of the heat ray shielding laminated transparent base.

Especially, in a case of bonding the infrared reflective film to a transparent glass base material, regarding the infrared reflective film, it is preferred that a maximum value of a reflectance with respect to the light of the wavelength of 700 nm to 1200 nm is greater than or equal to 30% and less than or equal to 100%.

Also, in view of the light transmittance of the visual region, it is preferable for the infrared reflective film to hardly absorb the sunlight in the visual region. Especially, in a case of bonding to the infrared reflective film to the transparent base material, it is preferable for the visual ray transmittance to be greater than or equal to 80%, and further preferable to be greater than or equal to 85%.

It is preferable for the infrared reflective film to have both the heat ray shielding performance and the light transmittance of the visible region. Accordingly, in a case of bonding the infrared reflective film to the transparent base material, it is preferable for the visual ray transmittance to be greater than or equal to 80% and for the maximum value of the reflectance to the light of the wavelength of 700 nm to 1200 nm to be greater than or equal to 30% and less than or equal to 100%. Especially, in a case of bonding the infrared reflective film to the transparent base material, it is preferable for the visual ray transmittance to be greater than or equal to 85%, and for the maximum value of the reflectance to the light with the wavelength of 700 nm to 1200 nm to be greater than or equal to 50% and less than or equal to 100%.

Also, in a case of using the heat ray shielding laminated transparent base for use to a front glass of the vehicle, the window of the building, and the like requiring a transmission of an electromagnetic wave of a predetermined wavelength range, it is preferable for the infrared reflective film to transmit the electromagnetic wave of the wavelength range used for a cellular phone and an ETC. Therefore, in this case, as the infrared reflective film, instead of a film with a metal film, which has conductivity and does not transmit electromagnetic waves of the above described wavelength region, a film transmitting the electromagnetic waves is preferable. For instance, it is preferable to use a film having a property of reflecting the infrared ray by a multilayer film, in which resins having different refractive indexes are alternately stacked, a film having the property of reflecting the infrared ray by a cholesteric liquid crystal, and the like.

A shielding property of the heat ray shielding laminated transparent base material of the embodiment is represented by the sunlight transmittance with respect to the visual ray transmittance. The lower the sunlight transmittance with respect to the visual ray transmittance is, the more superior the shielding property of the heat ray shielding laminated transparent base material. Specifically, for instance, in a case in which the addition amount and the like of the composite tungsten oxide to the heat ray shielding film are selected so that the visual ray transmittance of the heat ray shielding laminated transparent base material, it is preferable for the sunlight transmittance of the heat ray shielding laminated transparent base material to be less than or equal to 50%, and is further preferable to be less than or equal to 40%.

In a case of using the heat ray shielding laminated transparent base material 40 illustrated in FIG. 3 for the window material, for instance, such as the front glass or the like of the vehicle, the visual ray transmittance is regulated by Road Transport Vehicle Act to satisfy 70% or more, and is also preferable to have the high heat ray shielding performance. Therefore, for instance, as described above, in a case in that the visual ray transmittance of the heat ray shielding laminated transparent base material is set to be 70%, the sunlight transmittance is preferably to be 50%, and is further preferably to be 40%.

Especially, it is preferred that the visual ray transmittance of the heat ray shielding laminated transparent base material is greater than or equal to 70%, and the sunlight transmittance is greater than or equal to 50%. It is further preferred that the visual ray transmittance is greater than or equal to 70%, and the sunlight transmittance is greater than or equal to 40%.

By using the heat ray shielding laminated transparent base material having the high heat ray shielding performance, for the vehicle using a battery such as a hybrid car and an electric vehicle, a battery consumption is reduced. Thus, a significant effect can be observed to extend cruising distance. Accordingly, it is expected to improve the fuel economy, and contribute to reduce greenhouse gas emissions. The heat ray shielding laminated transparent base material is expected to be an essential material for a design of the vehicle in the future.

In a case in which the heat ray shielding laminated transparent base material is used, for instance, as the window materials of the vehicle and the building, it is preferably close to a natural color tone, that is, transparent or achromatic color. Especially, it is assumed that the heat ray shielding laminated transparent base material is used for the front grass of the vehicle or the like. In this case, in order to ensure safety during driving, it is preferable that color of the fluoroscopic image is normally distinguishable.

In this application using the heat ray shielding film used for the heat ray shielding laminated transparent base material, color of fluoroscopic image is preferably to be normally distinguishable in a color discrimination test according to JIS R 3211 and JIS R 3212, which regulates a performance required to a laminated glass for the vehicle.

The heat ray shielding laminated transparent base material of the embodiment is capable of being used for various applications. The window material including the heat ray shielding laminated transparent base material is suitably used as the window of the vehicle and the building. Especially, for example, it is possible to realize the vehicle mounting the window material including the heat ray shielding laminated transparent base material, and the building with the window materials including the heat ray shielding laminated transparent base material.

The manufacturing method of the heat ray shielding laminated transparent base material of the embodiment is not specifically limited. A bonding process may be included so that the intermediate layer including the above described heat ray shielding film is disposed between the transparent base materials, and the transparent base material and the intermediate layer including the heat ray shielding film are bonded to each other.

A method for bonding the transparent base material and the heat ray shielding film is not specifically limited. Various methods may be used such as a method for bonding method using an adhesive or the like, a method of thermocompression bonding.

Also, the intermediate layer including the heat ray shielding film may be a single film formed by the heat ray shielding films. For instance, as described above, the intermediate layer may be stacked and integrated with another film (layer) such as the multilayer film in which the infrared reflective film and the heat ray shielding film are integrated.

The heat ray shielding laminated transparent base material of the embodiment includes the heat ray shielding film having the above described high weather resistance. Hence, even in a case in which the heat ray shielding film is exposed from the transparent base material and is being placed under the environment of the high temperature and the high humidity, the occurrence of the color reducing phenomena is suppressed. Accordingly, it is possible to maintain the high permeability of the light of the visible region and the lower sunlight transmittance. Moreover, it is possible to suppress the damage of the appearance of the heat ray shielding laminated transparent base material, and the deterioration of the heat ray shielding performance.

Also, the heat ray shielding laminated transparent base material of the embodiment includes the above described heat ray shielding film. In addition, the heat ray shielding film contains the composite tungsten oxide particles as the particles of the infrared absorption. It is possible to maintain the high visual ray transmittance and simultaneously accomplish the high heat ray shielding performance. Accordingly, for instance, in a case of applying to the window of the vehicle and the building, the amenity inside the vehicle and the building is improved, the fuel economy is improved by reducing the load of the air condition inside the vehicle, the energy is saved by reducing the load of the air condition inside the building, and the like.

EXAMPLES

In the following, the present invention will be described in detail by referring to examples. However, the present invention is not limited to the following examples.

First, an evaluation method of specimen in the examples below and comparison examples will be described.

(Volume Average of Particle Diameter)

A volume average of the particle diameter of the composite tungsten oxide particles in a fine particle dispersion was measured by a micro track particle size distribution meter (Nikkiso Co., Ltd., Model: UPA-UT).

(Total Light Transmittance)

The total light transmittance of the heat ray shielding film was measured by a Haze permeability meter (Murakami Color Research Laboratory Co., Ltd., Model:HM-150) in accordance with JIS K 7361-1.

It is noted that the total light transmittance was measured before a weathering test and after the test.

(Visual Ray Transmittance, Sunlight Transmittance)

The visual ray transmittance and the sunlight transmittance of the heat ray shielding laminated transparent base material were calculated in accordance with JIS R 3106 based on the transmittance from 200 nm to 2600 nm measured by a spectrophotometer (Hitachi, Ltd., Model: U-4100).

In the following, each of fabrication conditions and evaluation results of specimens of examples and comparison examples will be described.

Example 1

20 parts by mass of $Cs_{0.33}WO_3$ particles was weighted as the composite tungsten oxide particles, 10 parts by mass of the dispersant (amine value 48 mgKOH/g, decomposition temperature 250° C.) (hereinafter, described as a "dispersant 'a'"), which includes an amine-containing group and the acrylic main chain, was weighted as the functional group, and 70 parts by mass of the methyl isobutyl ketone (boiling point 116.2° C.) was weighted. These materials were loaded in a paint shaker where 0.3 mmφ$ZrO_2$ beads, and a milling/dispersion treatment had been conducted for 10 hours. Then, dispersion liquid of particles 'a' (hereinafter, described as a "particle dispersion liquid 'a'") was acquired (dispersion preparation process).

It is noted that the hexagonal crystals $Cs_{0.33}WO_3$ were observed in the particles 'a', when a powder X-ray diffraction measurement was conducted beforehand for the particles 'a'.

The volume average of the particle diameter of the composite tungsten oxide particles in the particle dispersion liquid a was measured by the above described method, and was resulted as 21 nm. It is noted that an operation, which causes the volume average of the particle diameter of the composite tungsten oxide particles, such as the milling process or the like, is not conducted in a subsequent process. Hence, this volume average of the particle diameter becomes the volume average of the particle diameter of the composite tungsten oxide particles in the heat ray shielding film.

The dispersant 'a' was added to and thoroughly mixed with the particle dispersion liquid 'a', so that a mass ratio of the dispersant with respect to the composite tungsten oxide in the dispersion liquid indicates

[composite tungsten oxide]/[dispersant]=100/200.

It is noted that the mass of the dispersant in the above formula indicates a sum of a quantity added in the dispersion liquid manufacturing process and a quantity added after the particle dispersion liquid 'a' is manufactured when fabricating the particle dispersant 'a'.

Then, an acquired mixed liquid is loaded to an agitation type vacuum dryer.

As a result, the methyl isobutyl ketone was eliminated by conducting a vacuum drying at a room temperature by the agitation type vacuum dryer, and a dispersant of the particles 'a' (hereinafter, described as a "dispersant 'a'") was acquired. An acquired methyl isobutyl ketone content was 2.9 mass % (dispersion manufacturing process).

98.5 parts by mass of Himilan 1706 (manufactured by Mitsui-Du Pont Polychemical Co., Ltd., described as ethylene ionomer 1 in Table 1), which is a pellet of the ionomer resin, and 1.5 parts by mass of the dispersant 'a' were measured and thoroughly mixed. It is noted that the Himilan 1706 is the ethylene-based ionomer and contains zinc as the metal ion.

The acquired mixture of the pellet of the ionomer resin and the dispersant 'a' was supplied to a twin screw extruder set at 220° C., and was kneaded (kneading process). After the kneading process, the mixture was formed to be a sheet of 0.5 mm thickness by an extrusion calender roll method from a T die (molding process). By these processes, the heat ray shielding film (hereinafter, described as a "heat ray shielding film A") was acquired. The content of the composite tungsten oxide particles in the heat ray shielding film A is 1.2 g/m² per unit area in a projected area of the fabricated heat ray shielding film A.

The total light transmittance of the heat ray shielding film A was measured, and was found to be 72.9%. The heat ray shielding film A was placed in a constant temperature and humidity chamber where temperature 85° C. and relative humidity 90% are set for the weathering test, and was removed after 24 hours. The total light transmittance was measured, again, and was found to be 73.0%. Accordingly, before and after the weathering test, the change of the total light transmittance was 0.1%. Also, as a result of a visual confirmation, the color reducing phenomena, in which the color of the composite tungsten oxide particles in the heat ray shielding film A is reduced, was not observed even after the weathering test. This result is indicated below in Table 1.

TABLE 1

| | HEAT RAY SHIELDING FILM | | | | | TOTAL LIGHT TRANSMITTANCE(%) OF HEAT RAY SHIELDING FILM WEATHERING TEST | | |
|---|---|---|---|---|---|---|---|---|
| | COMPOSITE TUNGSTEN OXIDE | | | ULTRAVIOLET LIGHT ABSORBENT | | | | |
| | | CONTENT PER UNIT AREA | | | ADDITION | | | [AFTER TEST] − |
| | TYPE | (g/m²) | RESIN TYPE | TYPE | AMOUNT (MASS %) | BEFORE TEST | AFTER TEST | [BEFORE TEST] |
| EXAMPLE 1 | $Cs_{0.33}WO_3$ | 1.2 | ETHYLENE-BASED IONOMER 1 | — | — | 72.9 | 73.0 | 0.1 |
| EXAMPLE 2 | $Cs_{0.33}WO_3$ | 0.8 | ETHYLENE-BASED IONOMER 1 | — | — | 79.5 | 79.7 | 0.2 |
| EXAMPLE 3 | $Cs_{0.33}WO_3$ | 0.3 | ETHYLENE-BASED IONOMER 1 | — | — | 85.8 | 85.9 | 0.1 |
| EXAMPLE 4 | $Cs_{0.33}WO_3$ | 1.2 | ETHYLENE-BASED IONOMER 2 | — | — | 72.0 | 72.7 | 0.7 |
| EXAMPLE 5 | $Cs_{0.33}WO_3$ | 1.2 | ETHYLENE-BASED IONOMER 1 | (CHEMICAL FORMULA 1) | 0.2 | 72.1 | 72.4 | 0.3 |
| EXAMPLE 6 | $Cs_{0.33}WO_3$ | 1.2 | ETHYLENE-BASED IONOMER 1 | (CHEMICAL FORMULA 1) | 1.0 | 71.5 | 71.8 | 0.3 |
| EXAMPLE 7 | $Cs_{0.33}WO_3$ | 1.2 | ETHYLENE-BASED IONOMER 1 | (CHEMICAL FORMULA 1) | 2.0 | 72.2 | 72.3 | 0.1 |
| EXAMPLE 8 | $Cs_{0.33}WO_3$ | 1.2 | ETHYLENE-BASED IONOMER 1 | (CHEMICAL FORMULA 1) | 3.0 | 71.4 | 71.7 | 0.3 |
| EXAMPLE 9 | $Cs_{0.33}WO_3$ | 1.2 | ETHYLENE-BASED IONOMER 1 | (CHEMICAL FORMULA 2) | 0.5 | 72.3 | 72.5 | 0.2 |

TABLE 1-continued

| | HEAT RAY SHIELDING FILM | | | | | TOTAL LIGHT TRANSMITTANCE(%) OF HEAT RAY SHIELDING FILM WEATHERING TEST | | |
|---|---|---|---|---|---|---|---|---|
| | COMPOSITE TUNGSTEN OXIDE | | | ULTRAVIOLET LIGHT ABSORBENT | | | | |
| | TYPE | CONTENT PER UNIT AREA (g/m$^2$) | RESIN TYPE | TYPE | ADDITION AMOUNT (MASS %) | BEFORE TEST | AFTER TEST | [AFTER TEST] − [BEFORE TEST] |
| EXAMPLE 10 | $Cs_{0.33}WO_3$ | 1.2 | ETHYLENE-BASED IONOMER 1 | (CHEMICAL FORMULA 2) | 1.0 | 71.9 | 72.4 | 0.5 |
| EXAMPLE 11 | $Rb_{0.33}WO_3$ | 1.2 | ETHYLENE-BASED IONOMER 1 | — | — | 73.1 | 73.9 | 0.8 |
| COMPARISON EXAMPLE 1 | $Cs_{0.33}WO_3$ | 1.2 | POLYVINYL BUTYLAL RESIN | — | — | 71.6 | 75.0 | 3.4 |
| COMPARISON EXAMPLE 2 | $Cs_{0.33}WO_3$ | 1.2 | ETHYLENE-VINYL ACETATE COPOLYMER | — | — | 71.1 | 87.9 | 16.8 |

After the fabricated heat ray shielding film A was temporarily sandwiched with two transparent float glass (3 mm thickness), the fabricated heat ray shielding film A was heated at 130° C., the heat ray shielding laminated transparent base material (hereinafter, described as a "heat ray shielding laminated transparent base material A") was acquired by conducting a press process for 5 minutes under vacuum.

Regarding the heat ray shielding laminated transparent base material A, the visual ray transmittance and the sunlight transmittance are measured and calculated in accordance with the above described method. The visual ray transmittance was found to be 71.5% and the sunlight transmittance was found to be 34.9%.

Also, the heat ray shielding laminated transparent base material A was placed in the constant temperature and humidity chamber where the temperature 85° C. and relative humidity 90% were set for the weathering test, and was removed after 24 hours. The appearance of the heat ray shielding laminated transparent base material A was observed. The color reducing phenomena (edge fade phenomena), in which the color is reduced from an unsealed edge of the heat ray shielding laminated transparent base material A, was not observed. The evaluation result regarding the heat ray shielding laminated transparent base material A is indicated in Table 2.

TABLE 2

| | PRESENCE OR ABSENCE OF INFRARED REFLECTION FILM | EVALUATION RESULT OF HEAT-RAY SHIELDING TRANSPARENT LAMINATED SUBSTRATE | | |
|---|---|---|---|---|
| | | VISIBLE RAY TRANSMITTANCE (%) | SUNSHINE TRANSMITTANCE (%) | PRESENCE OR ABSENCE OF OCCURRENCE OF EDGE FADE PHENOMENA IN WEATHERING TEST |
| EXAMPLE 1 | ABSENCE | 71.5 | 34.9 | ABSENCE |
| EXAMPLE 2 | ABSENCE | 78.8 | 45.2 | ABSENCE |
| EXAMPLE 3 | ABSENCE | 84.8 | 61.5 | ABSENCE |
| EXAMPLE 4 | ABSENCE | 70.8 | 35.2 | ABSENCE |
| EXAMPLE 5 | ABSENCE | 71.2 | 33.4 | ABSENCE |
| EXAMPLE 6 | ABSENCE | 70.3 | 32.5 | ABSENCE |
| EXAMPLE 7 | ABSENCE | 71.1 | 32.5 | ABSENCE |
| EXAMPLE 8 | ABSENCE | 70.8 | 32.3 | ABSENCE |
| EXAMPLE 9 | ABSENCE | 71.9 | 33.2 | ABSENCE |
| EXAMPLE 10 | ABSENCE | 71.5 | 32.8 | ABSENCE |
| EXAMPLE 11 | ABSENCE | 72.0 | 36.1 | ABSENCE |
| EXAMPLE 12 | PRESENCE | 70.8 | 31.1 | ABSENCE |
| COMPARISON EXAMPLE 1 | ABSENCE | 70.9 | 33.4 | PRESENCE |
| COMPARISON EXAMPLE 2 | ABSENCE | 70.0 | 34.1 | PRESENCE |

Example 2

The heat ray shielding film was fabricated similar to Example 1, except for a point in which a ratio of the materials supplied to the kneading process was changed.

Especially, 99.0 parts by mass of Himilan 1706 as the pellet of the ionomer resin and 1.0 parts by mass of the dispersant 'a' were measured and thoroughly mixed. A preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film B") was acquired.

It is noted that the content of the composite tungsten oxide particles in the heat ray shielding film B was 0.8 g/m$^2$ per unit area in the projected area of the fabricated heat ray shielding film B.

The total light transmittance of the heat ray shielding film B was measured, and was found to be 79.5%. Similar to Example 1, after the weathering test was conducted, the total light transmittance of the heat ray shielding film B was measured again, and was found to be 79.7%. Accordingly, before and after the weathering test, the change of the total light transmittance was 0.2%. Also, as a result of the visual confirmation, the color reducing phenomena, in which the color of the composite tungsten oxide particles in the heat ray shielding film B was reduced, was not observed even after the weathering test. This result is indicated below in Table 1.

Also, the heat ray shielding laminated transparent base material (hereinafter, described as a "heat ray shielding laminated transparent base material B") was acquired. Optical properties of the heat ray shielding laminated transparent base material B was measured. As a result, the visual ray transmittance was found to be 78.8% and the sunlight transmittance was found to be 45.2%.

Also, similar to a case of Example 1, after the weathering test was conducted for the acquired heat ray shielding film B, the appearance was observed. The color reducing phenomena (edge fade phenomena), in which the color is reduced from the unsealed edge of the heat ray shielding laminated transparent base material B, was not observed. The evaluation result regarding the heat ray shielding laminated transparent base material B is indicated in Table 2.

Example 3

The heat ray shielding film was fabricated similar to Example 1, except for a point in which the ratio of the materials supplied to the kneading process was changed.

Especially, 99.6 parts by mass of Himilan 1706 as the pellet of the ionomer resin and 0.4 parts by mass of the dispersant 'a' were measured and thoroughly mixed. The preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film C") was acquired.

It is noted that the content of the composite tungsten oxide particles in the heat ray shielding film C was 0.3 g/m$^2$ per unit area in the projected area of the fabricated heat ray shielding film C.

The total light transmittance of the heat ray shielding film C was measured, and was found to be 85.8%. Similar to Example 1, after the weathering test was conducted, the total light transmittance of the heat ray shielding film C was measured again, and was found to be 85.9%. Accordingly, before and after the weathering test, the change of the total light transmittance was 0.1%. Also, as the result of the visual confirmation, the color reducing phenomena, in which the color of the composite tungsten oxide particles in the heat ray shielding film C was reduced, was not observed even after the weathering test. This result is indicated below in Table 1.

Also, the heat ray shielding laminated transparent base material (hereinafter, described as a "heat ray shielding laminated transparent base material C") was acquired. Optical properties of the heat ray shielding laminated transparent base material C was measured. As a result, the visual ray transmittance was found to be 84.8% and the sunlight transmittance was found to be 61.5%.

Also, similar to a case of Example 1, after the weathering test was conducted for the acquired heat ray shielding film C, the appearance was observed. The color reducing phenomena (edge fade phenomena), in which the color is reduced from the unsealed edge of the heat ray shielding laminated transparent base material C, was not observed. The evaluation result regarding the heat ray shielding laminated transparent base material C is indicated in Table 2.

Example 4

The heat ray shielding film was acquired similar to Example 1 except that instead of Himilan 1706, IOTEK IONOMERS 4200 (manufactured by EXXON MOBIL CHEMICAL CO., LTD., described as an "ethylene ionomer 2" in Table 1) was used. IOTEK IONOMERS 4200 is an ethylene ionomer and contains zinc as the metal ion.

It is noted that the content of the composite tungsten oxide particles in the heat ray shielding film D was 1.2 g/m$^2$ per unit area in the projected area of the fabricated heat ray shielding film D.

The total light transmittance of the heat ray shielding film D was measured, and was found to be 72.0%. Similar to Example 1, after the weathering test was conducted, the total light transmittance of the heat ray shielding film D was measured again, and was found to be 72.7%. Accordingly, before and after the weathering test, the change of the total light transmittance was 0.7%. Also, as the result of the visual confirmation, the color reducing phenomena, in which the color of the composite tungsten oxide particles in the heat ray shielding film D was reduced, was not observed even after the weathering test. This result is indicated below in Table 1.

Also, the heat ray shielding laminated transparent base material (hereinafter, described as a "heat ray shielding laminated transparent base material D") was acquired. Optical properties of the heat ray shielding laminated transparent base material D were measured. As a result, the visual ray transmittance was found to be 70.8% and the sunlight transmittance was found to be 35.2%.

Also, similar to a case of Example 1, after the weathering test was conducted for the acquired heat ray shielding film D, the appearance was observed. The color reducing phenomena (edge fade phenomena), in which the color is reduced from the unsealed edge of the heat ray shielding laminated transparent base material D, was not observed. The evaluation result regarding the heat ray shielding laminated transparent base material D is indicated in Table 2.

Example 5

The heat ray shielding film was fabricated similar to Example 1, except for a change in which the ultraviolet absorbent was added to the materials to be supplied to the kneading process.

Especially, 98.3 parts by mass of Himilan 1706 as the pellet of the ionomer resin, 1.5 parts by mass of the dispersant 'a', and 0.2 parts by mass of Tinuvin (registered trademark) 326 (manufactured by BASF) were measured and thoroughly mixed.

It is noted that Tinuvin 326 being the ultraviolet absorbent is a benzotriazole compound represented by the above described chemical formula 1. Also, the preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film E") was acquired.

It is noted that the content of the composite tungsten oxide particles in the heat ray shielding film E was 1.2 g/m$^2$ per unit area in the projected area of the fabricated heat ray shielding film E.

The total light transmittance of the heat ray shielding film E was measured, and was found to be 72.1%. Similar to Example 1, after the weathering test was conducted, the total light transmittance of the heat ray shielding film E was measured again, and was found to be 72.4%. Accordingly, before and after the weathering test, the change of the total light transmittance was 0.3%. Also, as the result of the visual confirmation, the color reducing phenomena, in which the color of the composite tungsten oxide particles in the heat ray shielding film E was reduced, was not observed even after the weathering test. This result is indicated below in Table 1.

Also, the heat ray shielding laminated transparent base material (hereinafter, described as a "heat ray shielding laminated transparent base material E") was acquired. Optical properties of the heat ray shielding laminated transparent base material E were measured. As a result, the visual ray transmittance was found to be 71.2% and the sunlight transmittance was found to be 33.4%.

Also, similar to a case of Example 1, after the weathering test was conducted for the acquired heat ray shielding film E, the appearance was observed. The color reducing phenomena (edge fade phenomena), in which the color is reduced from the unsealed edge of the heat ray shielding laminated transparent base material E, was not observed. The evaluation result regarding the heat ray shielding laminated transparent base material E is indicated in Table 2.

Example 6

The heat ray shielding film was fabricated similar to Example 5, except for a point in which compositions of the materials to supply to the kneading process were changed.

Especially, 97.5 parts by mass of Himilan 1706 as the pellet of the ionomer resin, 1.5 parts by mass of the dispersant 'a', and 1.0 parts by mass of Tinuvin 326 were measured and thoroughly mixed. The preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film F") was acquired.

It is noted that the content of the composite tungsten oxide particles in the heat ray shielding film F was 1.2 g/m$^2$ per unit area in the projected area of the fabricated heat ray shielding film F.

The total light transmittance of the heat ray shielding film F was measured, and was found to be 71.5%. Similar to Example 1, after the weathering test was conducted, the total light transmittance of the heat ray shielding film F was measured again, and was found to be 71.8%. Accordingly, before and after the weathering test, the change of the total light transmittance was 0.3%. Also, as the result of the visual confirmation, the color reducing phenomena, in which the color of the composite tungsten oxide particles in the heat ray shielding film F was reduced, was not observed even after the weathering test. This result is indicated below in Table 1.

Also, the heat ray shielding laminated transparent base material (hereinafter, described as a "heat ray shielding laminated transparent base material F") was acquired. Optical properties of the heat ray shielding laminated transparent base material F were measured. As a result, the visual ray transmittance was found to be 70.3% and the sunlight transmittance was found to be 2.5%.

Also, similar to a case of Example 1, after the weathering test was conducted for the acquired heat ray shielding film F, the appearance was observed. The color reducing phenomena (edge fade phenomena), in which the color is reduced from the unsealed edge of the heat ray shielding laminated transparent base material F, was not observed. The evaluation result regarding the heat ray shielding laminated transparent base material F is indicated in Table 2.

Example 7

The heat ray shielding film was fabricated similar to Example 5, except for a point in which compositions of the materials to supply to the kneading process were changed.

Especially, 96.5 parts by mass of Himilan 1706 as the pellet of the ionomer resin, 1.5 parts by mass of the dispersant 'a', and 2.0 parts by mass of Tinuvin 326 were measured and thoroughly mixed. The preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film G") was acquired.

It is noted that the content of the composite tungsten oxide particles in the heat ray shielding film G was 1.2 g/m$^2$ per unit area in the projected area of the fabricated heat ray shielding film G.

The total light transmittance of the heat ray shielding film G was measured, and was found to be 72.2%. Similar to Example 1, after the weathering test was conducted, the total light transmittance of the heat ray shielding film G was measured again, and was found to be 72.3%. Accordingly, before and after the weathering test, the change of the total light transmittance was 0.1%. Also, as the result of the visual confirmation, the color reducing phenomena, in which the color of the composite tungsten oxide particles in the heat ray shielding film G was reduced, was not observed even after the weathering test. This result is indicated below in Table 1.

Also, the heat ray shielding laminated transparent base material (hereinafter, described as a "heat ray shielding laminated transparent base material G") was acquired. Optical properties of the heat ray shielding laminated transparent base material G were measured. As a result, the visual ray transmittance was found to be 71.1% and the sunlight transmittance was found to be 32.5%.

Also, similar to a case of Example 1, after the weathering test was conducted for the acquired heat ray shielding film G, the appearance was observed. The color reducing phenomena (edge fade phenomena), in which the color is reduced from the unsealed edge of the heat ray shielding laminated transparent base material G, was not observed. The evaluation result regarding the heat ray shielding laminated transparent base material G is indicated in Table 2.

Example 8

The heat ray shielding film was fabricated similar to Example 5, except for a point in which compositions of the materials to supply to the kneading process were changed.

Especially, 95.5 parts by mass of Himilan 1706 as the pellet of the ionomer resin, 1.5 parts by mass of the dispersant 'a', and 3.0 parts by mass of Tinuvin 326 were measured and thoroughly mixed. The preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film H") was acquired.

It is noted that the content of the composite tungsten oxide particles in the heat ray shielding film H was 1.2 g/m$^2$ per unit area in the projected area of the fabricated heat ray shielding film H.

The total light transmittance of the heat ray shielding film H was measured, and was found to be 71.4%. Similar to Example 1, after the weathering test was conducted, the total light transmittance of the heat ray shielding film H was measured again, and was found to be 71.7%. Accordingly, before and after the weathering test, the change of the total light transmittance was 0.3%. Also, as the result of the visual confirmation, the color reducing phenomena, in which the color of the composite tungsten oxide particles in the heat ray shielding film H was reduced, was not observed even after the weathering test. This result is indicated below in Table 1.

Also, the heat ray shielding laminated transparent base material (hereinafter, described as a "heat ray shielding laminated transparent base material H") was acquired. Optical properties of the heat ray shielding laminated transparent base material H were measured. As a result, the visual ray transmittance was found to be 70.8% and the sunlight transmittance was found to be 32.3%.

Also, similar to a case of Example 1, after the weathering test was conducted for the acquired heat ray shielding film H, the appearance was observed. The color reducing phenomena (edge fade phenomena), in which the color is reduced from the unsealed edge of the heat ray shielding laminated transparent base material H, was not observed. The evaluation result regarding the heat ray shielding laminated transparent base material H is indicated in Table 2.

Example 9

The heat ray shielding film was fabricated similar to Example 1, except for a point in which compositions of the materials to supply to the kneading process were changed.

Especially, 97.4 parts by mass of Himilan 1706 as the pellet of the ionomer resin, 1.5 parts by mass of the dispersant 'a', 0.5 parts by mass of Tinuvin 328 (manufactured by BASF), 0.3 parts by mass of Irgafos (registered trademark) 168 (manufactured by BASF), and 0.3 parts by mass of CHIMASSORB (registered trademark) 2020 (manufactured by BASF) were measured and thoroughly mixed.

It is noted that Tinuvin 328 serving as the ultraviolet absorbent is the benzotriazole compound expressed by the existing chemical formula 2. Irgafos 168 serving as the oxidation inhibitor is tris (2,4-di-tert-butylphenyl) phosphite indicated by CAS No. 31570-04-4. The CHIMASSORB 2020 serving as HALS is a polycondensate of dibutylamine, 1.3.5-Triazine, N, N'-bis(2,2,6,6-tetramethyl-4-piperidyl)-1, 6-hexamethylenediamine and N-(2,2,6,6-tetramethyl-4-piperidyl) butylamine indicated by CAS No. 192268-64-7. Also, the preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film I") was acquired.

It is noted that the content of the composite tungsten oxide particles in the heat ray shielding film I was 1.2 g/m$^2$ per unit area in the projected area of the fabricated heat ray shielding film I.

The total light transmittance of the heat ray shielding film I was measured, and was found to be 72.3%. Similar to Example 1, after the weathering test was conducted, the total light transmittance of the heat ray shielding film I was measured again, and was found to be 72.5%. Accordingly, before and after the weathering test, the change of the total light transmittance was 0.2%. Also, as the result of the visual confirmation, the color reducing phenomena, in which the color of the composite tungsten oxide particles in the heat ray shielding film I was reduced, was not observed even after the weathering test. This result is indicated below in Table 1.

Also, the heat ray shielding laminated transparent base material (hereinafter, described as a "heat ray shielding laminated transparent base material I") was acquired. Optical properties of the heat ray shielding laminated transparent base material I were measured. As a result, the visual ray transmittance was found to be 71.9% and the sunlight transmittance was found to be 33.2%.

Also, similar to a case of Example 1, after the weathering test was conducted for the acquired heat ray shielding film I, the appearance was observed. The color reducing phenomena (edge fade phenomena), in which the color is reduced from the unsealed edge of the heat ray shielding laminated transparent base material I, was not observed. The evaluation result regarding the heat ray shielding laminated transparent base material I is indicated in Table 2.

Example 10

The heat ray shielding film was fabricated similar to Example 1, except for a point in which compositions of the materials to supply to the kneading process were changed.

Especially, 96.8 parts by mass of Himilan 1706 as the pellet of the ionomer resin, 1.5 parts by mass of the dispersant 'a', 1.0 parts by mass of Tinuvin 328, 0.4 parts by mass of Irganox (registered trademark) 1010 (manufactured by BASF), and 0.3 parts by mass of Tinuvin 144 (manufactured by BASF) were measured and thoroughly mixed.

It is noted that Tinuvin 328 serving as the ultraviolet absorbent is the benzotriazole compound expressed by the existing chemical formula 2. Irganox 1010 serving as the oxidation inhibitor is the pentaerythritol tetrakis[3-(3,5-di-tert-butyl-4-hydroxyphenyl) propionate] indicated by CAS No. 6683-19-8. Tinuvin 144 serving as HALS is the bis(1,2,2,6,6-pentamethyl-4-piperidyl) [[3,5-bis (1,1-dimethylethyl)-4-hydrixyphenyl] methyl] butylmalonate. Also, the preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film J") was acquired.

It is noted that the content of the composite tungsten oxide particles in the heat ray shielding film J was 1.2 g/m² per unit area in the projected area of the fabricated heat ray shielding film J.

The total light transmittance of the heat ray shielding film J was measured, and was found to be 71.9%. Similar to Example 1, after the weathering test was conducted, the total light transmittance of the heat ray shielding film J was measured again, and was found to be 72.4%. Accordingly, before and after the weathering test, the change of the total light transmittance was 0.5%. Also, as the result of the visual confirmation, the color reducing phenomena, in which the color of the composite tungsten oxide particles in the heat ray shielding film J was reduced, was not observed even after the weathering test. This result is indicated below in Table 1.

Also, the heat ray shielding laminated transparent base material (hereinafter, described as a "heat ray shielding laminated transparent base material J") was acquired. Optical properties of the heat ray shielding laminated transparent base material J were measured. As a result, the visual ray transmittance was found to be 71.5% and the sunlight transmittance was found to be 32.8%.

Also, similar to a case of Example 1, after the weathering test was conducted for the acquired heat ray shielding film J, the appearance was observed. The color reducing phenomena (edge fade phenomena), in which the color is reduced from the unsealed edge of the heat ray shielding laminated transparent base material J, was not observed. The evaluation result regarding the heat ray shielding laminated transparent base material J is indicated in Table 2.

Example 11

20 parts by mass of $Rb_{0.33}WO_3$ particles (hereinafter, described as a "particles 'b'''") was weighted as the composite tungsten oxide particles, 10 parts by mass of the dispersant 'a', and 70 parts by mass of the methyl isobutyl ketone serving as the organic solvent was weighted. These materials were loaded in a paint shaker where 0.3 mm $\varphi ZrO_2$ beads, and a milling/dispersion treatment had been conducted for 11 hours. Then, dispersion liquid of particles 'b' (hereinafter, described as a "particle dispersion liquid 'b'''") was acquired (dispersion preparation process).

It is noted that the hexagonal crystals $Rb_{0.33}WO_3$ were observed in the particles when the powder X-ray diffraction measurement was conducted beforehand for the particles 'b'.

The volume average of the particle diameter of the composite tungsten oxide particles in the particle dispersion liquid 'a' was measured by the above described method, and was 29 nm. It is noted that an operation, which causes the volume average of the particle diameter of the composite tungsten oxide particles, such as the milling process or the like, is not conducted in a subsequent process. Hence, this volume average of the particle diameter becomes the volume average of the particle diameter of the composite tungsten oxide particles in the heat ray shielding film.

The dispersant 'b' was added to and thoroughly mixed with the particle dispersion liquid 'b', so that a mass ratio of the dispersant with respect to the composite tungsten oxide in the dispersion liquid indicates

[Composite tungsten oxide]/[dispersant]=100/200.

It is noted that the mass of the dispersant in the above formula indicates a sum of a quantity added in the dispersion liquid manufacturing process and a quantity added after the particle dispersion liquid 'b' is manufactured when fabricating the particle dispersant 'b'.

Then, the acquired mixed liquid is loaded to the agitation type vacuum dryer.

As a result, the methyl isobutyl ketone was eliminated by conducting a vacuum drying at a room temperature by the agitation type vacuum dryer, and a dispersant of the particles 'b' (hereinafter, described as a "dispersant 'b'''") was acquired. An acquired methyl isobutyl ketone content was 3.4 mass % (dispersion manufacturing process).

98.5 parts by mass of Himilan 1706 serving as the pellet of the ionomer resin, and 1.5 parts by mass of the dispersant 'b' were measured and thoroughly mixed. It is noted that the Himilan 1706 is the ethylene-based ionomer and contains zinc as the metal ion.

The acquired mixture of the pellet of the ionomer resin and the dispersant 'b' was supplied to a twin screw extruder set at 220° C., and was kneaded (kneading process). After the kneading process, the mixture was formed to be a sheet of 0.5 mm thickness by an extrusion calender roll method from the T die (molding process). By these processes, the heat ray shielding film (hereinafter, described as a "heat ray shielding film K") was acquired.

It is noted that the content of the composite tungsten oxide particles in the heat ray shielding film K was 1.2 g/m² per unit area in the projected area of the fabricated heat ray shielding film K.

The total light transmittance of the heat ray shielding film K was measured, and was found to be 73.1%. Similar to Example 1, after the weathering test was conducted, the total light transmittance of the heat ray shielding film J was measured again, and was found to be 73.9%. Accordingly, before and after the weathering test, the change of the total light transmittance was 0.8%. Also, as the result of the visual confirmation, the color reducing phenomena, in which the color of the composite tungsten oxide particles in the heat ray shielding film K was reduced, was not observed even after the weathering test. This result is indicated below in Table 1.

Also, the heat ray shielding laminated transparent base material (hereinafter, described as a "heat ray shielding laminated transparent base material K") was acquired. Optical properties of the heat ray shielding laminated transparent base material K were measured. As a result, the visual ray transmittance was found to be 72.0% and the sunlight transmittance was found to be 36.1%.

Also, similar to a case of Example 1, after the weathering test was conducted for the acquired heat ray shielding film K, the appearance was observed. The color reducing phenomena (edge fade phenomena), in which the color is reduced from the unsealed edge of the heat ray shielding laminated transparent base material K, was not observed. The evaluation result regarding the heat ray shielding laminated transparent base material K is indicated in Table 2.

Example 12

Scotch Tint (registered trademark) Nano 90S serving as the infrared reflective film is bonded to the transparent float glass (3 mm thickness) (manufactured by 3M. Hereinafter, described as an "infrared reflective film 'a'"). It is noted that the optical properties of the infrared reflective film 'a' are measured by the spectrophotometer in a case of bonding to the transparent float glass serving as the transparent glass base material. In this case, the visual ray transmittance was found to be 89.2% and a reflectance with respect to the light of the wavelength of 700 nm to 1200 nm indicated a minimum 8.2% and a maximum 80.8%.

The heat ray shielding film A fabricated in Example 1

After the heat ray shielding film A fabricated in Example 1 was temporarily sandwiched with a transparent float glass (3 mm thickness) and the transparent float glass to which the infrared reflective film so that the infrared reflective film contacts to the heat ray shielding film A, the fabricated heat ray shielding film A was heated at 130° C., the heat ray shielding laminated transparent base material (hereinafter, described as a "heat ray shielding laminated transparent base material L") was acquired by conducting the press process for 5 minutes under vacuum.

Optical properties of the heat ray shielding laminated transparent base material K were measured. As a result, the visual ray transmittance was found to be 70.8% and the sunlight transmittance was found to be 31.1%.

Also, similar to Example 1, after the weathering test was conducted for the acquired heat ray shielding film L, the appearance was observed. The color reducing phenomena (edge fade phenomena), in which the color is reduced from the unsealed edge of the heat ray shielding laminated transparent base material L, was not observed. The evaluation result regarding the heat ray shielding laminated transparent base material L is indicated in Table 2.

Comparison Example 1

The heat ray shielding film was fabricated similar to Example 1, except for a point in which the compositions of the materials to supply to the kneading process were changed.

Especially, 70.4 parts by mass of powder of a polyvinyl butyral resin, 28.1 parts by mass of the triethylene glycol-di-2-ethylhexanonate 28.1 mass part, and 1.5 parts by mass of the dispersant 'a' were measured and thoroughly mixed.

The preparation method of the dispersant 'a' is described in Example 1, and explanation thereof will be omitted.

After that, the mixture was supplied to the twin screw extruder where was set at 210° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film a") was acquired.

It is noted that the content of the composite tungsten oxide particles in the heat ray shielding film a was 1.2 g/m$^2$ per unit area in the projected area of the fabricated heat ray shielding film a.

The total light transmittance of the heat ray shielding film a was measured, and was found to be 71.6%. Similar to Example 1, after the weathering test was conducted, the total light transmittance of the heat ray shielding film a was measured again, and was found to be 75.0%. Accordingly, before and after the weathering test, the change of the total light transmittance was 3.4%. Also, as the result of the visual confirmation, the color reducing phenomena, in which the color of the composite tungsten oxide particles in the heat ray shielding film a was reduced, was confirmed after the weathering test was conducted to the heat ray shielding film a. This result is indicated below in Table 1.

Also, similar to Example 1, except for a point in which the heat ray shielding film a fabricated in this comparison example were used, the heat ray shielding laminated transparent base material (hereinafter, described as a "heat ray shielding laminated transparent base material a") was acquired. Optical properties of the heat ray shielding laminated transparent base material a were measured. As a result, the visual ray transmittance was found to be 70.9% and the sunlight transmittance was found to be 33.4%.

Also, similar to Example 1, after the weathering test was conducted for the heat ray shielding laminated transparent base material a, the appearance was observed. The color reducing phenomena (edge fade phenomena), in which the color is reduced from the unsealed edge of the heat ray shielding laminated transparent base material a, was observed. The evaluation result regarding the heat ray shielding laminated transparent base material a is indicated in Table 2.

Comparison Example 2

The heat ray shielding film was fabricated similar to Example 1, except for a point in which the compositions of the materials to supply to the kneading process were changed.

Especially, 98.5 parts by mass of the pellet of an ethylene-vinyl acetate copolymer resin, and 1.5 parts by mass of the dispersant 'a' were measured and thoroughly mixed.

The preparation method of the dispersant 'a' is described in Example 1, and explanation thereof will be omitted.

After that, the mixture was supplied to the twin screw extruder set at 220° C., and was kneaded (kneading process). After the kneading process, the mixture was formed to be the sheet of 0.5 mm thickness by the extrusion calender roll method from the T die (molding process). By these processes, the heat ray shielding film (hereinafter, described as a "heat ray shielding film β") was acquired.

It is noted that the content of the composite tungsten oxide particles in the heat ray shielding film β was 1.2 g/m$^2$ per unit area in the projected area of the fabricated heat ray shielding film β.

The total light transmittance of the heat ray shielding film β was measured, and was found to be 71.1%. Similar to Example 1, after the weathering test was conducted, the total light transmittance of the heat ray shielding film β was measured again, and was found to be 87.9%. Accordingly, before and after the weathering test, the change of the total light transmittance was 16.8%. Also, as the result of the visual confirmation, the color reducing phenomena, in which the color of the composite tungsten oxide particles in the heat ray shielding film β was reduced, was confirmed after the weathering test was conducted to the heat ray shielding film β. This result is indicated below in Table 1.

Also, similar to Example 1, except for a point in which the heat ray shielding film β fabricated in this comparison example was used, the heat ray shielding laminated transparent base material (hereinafter, described as a "heat ray shielding laminated transparent base material β") was acquired. Optical properties of the heat ray shielding laminated transparent base material β were measured. As a result, the visual ray transmittance was found to be 70.0% and the sunlight transmittance was found to be 34.1%.

Also, similar to Example 1, after the weathering test was conducted for the heat ray shielding laminated transparent base material β, the appearance was observed. The color reducing phenomena (edge fade phenomena), in which the color is reduced from the unsealed edge of the heat ray shielding laminated transparent base material β, was observed. The evaluation result regarding the heat ray shielding laminated transparent base material β is indicated in Table 2.

According to the Examples and the comparison examples described above, it was confirmed that regarding each of the heat ray shielding films A to K in Example 1 to Example 11, compared with the heat ray shielding films α and β of the comparison examples 1 and 2, a change of the total light transmittance becomes smaller. Moreover, it was confirmed that the color reducing did not occur in Example 1 to Example 11 after the weathering test. However, in the comparison examples 1 and 2, it was confirmed that the color reducing phenomena occurred.

In Example 1 to Example 11, it is considered that the change of the total light transmittance becomes very small before and after the weathering test, since the composite tungsten oxide particles are dispersed in the ionomer resin, and a high moisture and heat resistance is exhibited.

On the contrary, in the comparison example, it seems that since the composite tungsten oxide particles were dispersed in the polyvinyl butyral resin, the moisture and heat resistance was not sufficient. Thus, a light transmission characteristic, which the composite tungsten oxide particles have, was greatly changed during the weathering test.

Also, in the comparison example 2, it seems that since the composite tungsten oxide particles are dispersed in the ethylene-vinyl acetate copolymer resin, the moisture and heat resistance was not also sufficient. A light transmission characteristic, which the composite tungsten oxide particles have, was greatly changed during the weathering test.

In Example 1 to Example 12 and the comparison examples 1 and 2, the heat ray shielding laminated transparent base material having a preferable thermal barrier properties was confirmed.

Regarding the heat ray shielding film included in the heat ray shielding laminated transparent base material, especially in Example 1 to Example 12, it was confirmed that by dispersing the composite tungsten oxide particles in the ionomer resin, the high moisture and heat resistance was exhibited, and the color reducing phenomena (edge fade phenomena) did not occur even after the weathering test. Accordingly, it is possible for the heat ray shielding laminated transparent base material of Example 1 to Example 12 to maintain the preferable shielding property after the weathering test. It is noted that the color reducing phenomena (edge fade phenomena) indicates a phenomena in which the color is reduced from the unsealed edge of the heat ray shielding laminated transparent base material.

Contrarily, in the comparison examples 1 and 2, the color reducing phenomena (edge fade phenomena) was observed after the weathering test, and it was confirmed that the appearance of the heat ray shielding laminated transparent base material was damaged.

In the above, the heat ray shielding film, the heat ray shielding laminated transparent base material, the vehicle, and the building are described in the embodiment, Examples 1 to 12, and the like. However, the present invention is not limited to the above-described embodiment, which has been disclosed specifically, but various variations and modifications may be made without departing from the scope of the invention as set forth in the accompanying claims.

The present application is based on and claims the benefit of priority of Japanese Priority Application No. 2014-160669 filed on Aug. 6, 2014, the entire contents of which are hereby incorporated by reference.

The invention claimed is:

1. A heat ray shielding film, comprising:
   composite tungsten oxide particles;
   an ionomer resin, and
   a dispersant that disperses the composite tungsten oxide particles in the ionomer resin, the dispersant having a thermal decomposition temperature greater than or equal to 250° C., the dispersant being an acryl styrene copolymer type dispersant containing a carboxyl group as a functional group or an acrylic dispersant containing an amine-containing group as a functional group,
   wherein the composite tungsten oxide particles are expressed by a general formula $M_xWO_y$, (where M denotes one or more kinds of elements selected from Cs, Rb, K, Ba, Li, Ca, Sr, Sn, and Na, and $0.1 \leq x \leq 0.5$ and $2.2 \leq y \leq 3.0$),
   wherein the ionomer resin contains ions of zinc, and
   wherein a change of the total light transmittance is less than or equal to 3% before and after standing for 24 hours in an environment of 85° C. temperature and 90% relative humidity.

2. The heat ray shielding film as claimed in claim 1, wherein the ionomer resin is an ethylene-based ionomer.

3. The heat ray shielding film as claimed in claim 1, wherein M of the general formula $M_xWO_y$ expressing a composite tungsten oxide is Cs and/or Rb.

4. The heat ray shielding film as claimed in claim 1, wherein the composite tungsten oxide is a hexagonal crystal.

5. The heat ray shielding film as claimed in claim 1, wherein a volume average of a particle diameter of the composite tungsten oxide particles is less than or equal to 100 nm.

6. The heat ray shielding film as claimed in claim 1, wherein a content of the composite tungsten oxide particles of the heat ray shielding film is greater than or equal to 0.05 g/m² and less than or equal to 5.0 g/m².

7. The heat ray shielding film as claimed in claim 1, further comprising an ultraviolet absorbent.

8. The heat ray shielding film as claimed in claim 7, wherein the ultraviolet absorbent contains one or more kinds selected from a benzotriazole compound and a benzophenone compound.

9. The heat ray shielding film as claimed in claim 7, wherein the ultraviolet absorbent contains a compound expressed by a chemical formula 1 and/or a chemical formula 2:

[Chemical Formula 1]

(CHEMICAL FORMULA 1)

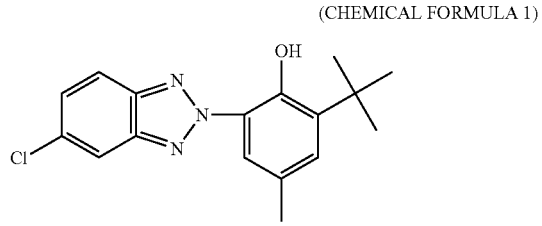

[Chemical Formula 2]

(CHEMICAL FORMULA 2)

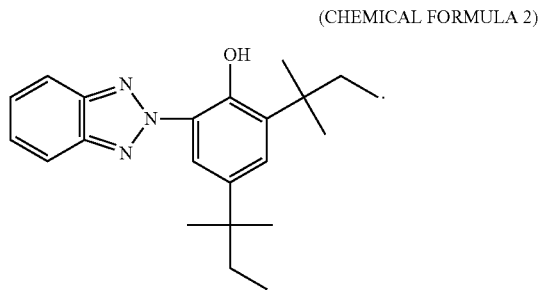

10. The heat ray shielding film as claimed in claim 7, wherein a content rate of the ultraviolet absorbent of the heat ray shielding film is greater than or equal to 0.02 mass % and less than or equal to 5.0 mass %.

11. A heat ray shielding laminated transparent base material, comprising:
multiple sheets of transparent base materials; and
a heat ray shielding film as claimed in claim 1,
wherein the heat ray shielding film is disposed among the multiple sheets of transparent base materials.

12. The heat ray shielding laminated transparent base material as claimed in claim 1, wherein at least one of the multiple sheets of the transparent base materials is a glass base material.

13. The heat ray shielding laminated transparent base material as claimed in claim 11, wherein at least one sheet of an infrared reflective film is further disposed among the multiple sheets of the transparent base materials.

14. The heat ray shielding laminated transparent base material as claimed in claim 13, wherein the infrared reflective film has a maximum value of a reflectance, which is greater than or equal to 30% and less than or equal to 100%, with respect to light with a wavelength of 700 nm to 1200 nm in a case of bonding the infrared reflective film to a transparent glass material.

15. A vehicle, comprising a window material including a heat ray shielding laminated transparent base material as claimed in claim 11.

16. A building, comprising a window material including a heat ray shielding laminated transparent base material as claimed in claim 11.

* * * * *